(12) United States Patent
Swonger

(10) Patent No.: US 9,354,654 B2
(45) Date of Patent: May 31, 2016

(54) HIGH VOLTAGE RING PUMP WITH INVERTER STAGES AND VOLTAGE BOOSTING STAGES

(71) Applicant: PEREGRINE SEMICONDUCTOR CORPORATION, San Diego, CA (US)

(72) Inventor: James W. Swonger, Cocoa, FL (US)

(73) Assignee: Peregrine Semiconductor Corporation, San Diego, CA (US)

( * ) Notice: Subject to any disclaimer, the term of this patent is extended or adjusted under 35 U.S.C. 154(b) by 0 days.

(21) Appl. No.: 14/230,945

(22) Filed: Mar. 31, 2014

(65) Prior Publication Data

US 2014/0361827 A1 Dec. 11, 2014

Related U.S. Application Data

(62) Division of application No. 13/105,743, filed on May 11, 2011, now Pat. No. 8,686,787.

(51) Int. Cl.
| | |
|---|---|
| *G05F 1/10* | (2006.01) |
| *G05F 3/04* | (2006.01) |
| *H02M 3/07* | (2006.01) |
| *H02M 1/00* | (2006.01) |

(52) U.S. Cl.
CPC . *G05F 3/04* (2013.01); *H02M 3/07* (2013.01); *H02M 2001/0077* (2013.01)

(58) Field of Classification Search
CPC .... G05F 3/04; H02M 3/07; H02M 2001/0077
USPC .................................. 327/536; 363/59, 60
See application file for complete search history.

(56) References Cited

U.S. PATENT DOCUMENTS

| | | |
|---|---|---|
| 3,470,443 A | 9/1969 | Berry et al. |
| 3,646,361 A | 2/1972 | Pfiffner |
| 3,731,112 A | 5/1973 | Smith |
| 3,878,450 A | 4/1975 | Greatbatch |
| 3,942,047 A | 3/1976 | Buchanan |
| 3,943,428 A | 3/1976 | Whidden |

(Continued)

FOREIGN PATENT DOCUMENTS

| | | |
|---|---|---|
| DE | 102005039138 | 2/2007 |
| EP | 0385641 A2 | 9/1990 |

(Continued)

OTHER PUBLICATIONS

Burgener, et al., Response After Final Office Action filed in the USPTO dated Dec. 18, 2014 for U.S. Appl. No. 13/769,780, 21 pgs.

(Continued)

*Primary Examiner* — Kenneth B Wells
(74) *Attorney, Agent, or Firm* — Jaquez Land Richman LLP; Martin J. Jaquez, Esq.; Alessandro Steinfl. Esq.

(57) ABSTRACT

A multi-stage device for boosting an input voltage is discussed. Each stage of the device comprises a stage of a ring oscillator and a charge pump. An oscillating signal, generated by the ring oscillator within the device, drives the charge pump in each stage of the device. The charge pumps of the stages are serially connected. A final stage of the multi-stage device is adapted to provide voltage to a load circuit. The multi-stage device is applicable for generation of different bias voltages from one or more source voltages.

11 Claims, 21 Drawing Sheets

(56) References Cited

U.S. PATENT DOCUMENTS

| | | |
|---|---|---|
| 3,955,353 A | 5/1976 | Astle |
| 3,975,671 A | 8/1976 | Stoll |
| 3,995,228 A | 11/1976 | Pass |
| 4,047,091 A | 9/1977 | Hutchines et al. |
| 4,061,929 A | 12/1977 | Asano |
| 4,068,295 A | 1/1978 | Portmann |
| 4,106,086 A | 8/1978 | Holbrook et al. |
| 4,158,182 A | 6/1979 | Washburn |
| 4,186,436 A | 1/1980 | Ishiwatari |
| 4,321,661 A | 3/1982 | Sano |
| 4,344,050 A | 8/1982 | Callahan |
| 4,374,357 A | 2/1983 | Olesin et al. |
| 4,388,537 A | 6/1983 | Kanuma |
| 4,390,798 A | 6/1983 | Kurafuji |
| 4,460,952 A | 7/1984 | Risinger |
| RE31,749 E | 11/1984 | Yamashiro |
| 4,485,433 A | 11/1984 | Topich |
| 4,575,644 A | 3/1986 | Leslie |
| 4,621,315 A | 11/1986 | Vaughn et al. |
| 4,633,106 A | 12/1986 | Backes et al. |
| 4,638,184 A | 1/1987 | Kimura |
| 4,679,134 A | 7/1987 | Bingham |
| 4,703,196 A | 10/1987 | Arakawa |
| 4,736,169 A | 4/1988 | Weaver et al. |
| 4,739,191 A | 4/1988 | Puar |
| 4,752,699 A | 6/1988 | Cranford et al. |
| 4,769,784 A | 9/1988 | Doluca et al. |
| 4,777,577 A | 10/1988 | Bingham et al. |
| 4,839,787 A | 6/1989 | Kojima et al. |
| 4,847,519 A | 7/1989 | Wahl et al. |
| 4,891,609 A | 1/1990 | Eilley |
| 4,897,774 A | 1/1990 | Bingham et al. |
| 4,918,336 A | 4/1990 | Graham et al. |
| 5,023,465 A | 6/1991 | Douglas et al. |
| 5,029,282 A | 7/1991 | Ito |
| 5,032,799 A | 7/1991 | Milberger et al. |
| 5,036,229 A | 7/1991 | Tran |
| 5,038,325 A | 8/1991 | Douglas et al. |
| 5,061,907 A | 10/1991 | Rasmussen |
| 5,068,626 A | 11/1991 | Takagi et al. |
| 5,075,572 A | 12/1991 | Poteet et al. |
| 5,081,371 A | 1/1992 | Wong |
| 5,093,586 A * | 3/1992 | Asari ............................ 327/530 |
| 5,111,375 A | 5/1992 | Marshall |
| 5,124,571 A | 6/1992 | Gillingham et al. |
| 5,126,590 A | 6/1992 | Chern |
| 5,138,190 A | 8/1992 | Yamazaki et al. |
| 5,146,178 A | 9/1992 | Nojima et al. |
| 5,180,928 A | 1/1993 | Choi |
| 5,182,529 A | 1/1993 | Chern |
| 5,193,198 A | 3/1993 | Yokouchi |
| 5,196,996 A | 3/1993 | Oh |
| 5,208,557 A | 5/1993 | Kersh, III |
| 5,212,456 A | 5/1993 | Kovalcik et al. |
| 5,216,588 A | 6/1993 | Bajwa et al. |
| 5,289,137 A | 2/1994 | Nodar et al. |
| 5,306,954 A | 4/1994 | Chan et al. |
| 5,392,186 A | 2/1995 | Alexander et al. |
| 5,392,205 A | 2/1995 | Zavaleta |
| 5,394,372 A | 2/1995 | Tanaka et al. |
| 5,408,140 A | 4/1995 | Kawai et al. |
| 5,418,499 A | 5/1995 | Nakao |
| 5,422,586 A | 6/1995 | Tedrow et al. |
| 5,446,418 A | 8/1995 | Hara et al. |
| 5,455,794 A | 10/1995 | Javanifard et al. |
| 5,465,061 A | 11/1995 | Dufour |
| 5,483,195 A | 1/1996 | Brown |
| 5,483,434 A | 1/1996 | Seesink |
| 5,493,249 A | 2/1996 | Manning |
| 5,519,360 A | 5/1996 | Keeth |
| 5,528,245 A | 6/1996 | Aker et al. |
| 5,535,160 A | 7/1996 | Yamaguchi |
| 5,546,031 A | 8/1996 | Seesink |
| 5,553,021 A | 9/1996 | Kubono et al. |
| 5,589,793 A | 12/1996 | Kassapian |
| 5,600,281 A | 2/1997 | Mori et al. |
| 5,670,907 A | 9/1997 | Gorecki et al. |
| 5,672,992 A | 9/1997 | Nadd |
| 5,677,649 A | 10/1997 | Martin |
| 5,677,650 A | 10/1997 | Kwasniewski et al. |
| 5,689,213 A | 11/1997 | Sher |
| 5,694,308 A | 12/1997 | Cave |
| 5,698,877 A | 12/1997 | Gonzalez |
| 5,734,291 A | 3/1998 | Tasdighi et al. |
| 5,757,170 A | 5/1998 | Pinney |
| 5,786,617 A | 7/1998 | Merrill et al. |
| 5,793,246 A | 8/1998 | Costello et al. |
| 5,808,505 A | 9/1998 | Tsukada |
| 5,818,289 A | 10/1998 | Chevallier et al. |
| 5,818,766 A | 10/1998 | Song |
| 5,864,328 A | 1/1999 | Kajimoto |
| 5,874,849 A | 2/1999 | Marotta et al. |
| 5,889,428 A | 3/1999 | Young |
| 5,892,400 A | 4/1999 | van Saders et al. |
| 5,969,988 A | 10/1999 | Tanzawa et al. |
| 5,986,649 A | 11/1999 | Yamazaki |
| 6,020,781 A | 2/2000 | Fujioka |
| 6,064,275 A | 5/2000 | Yamauchi |
| 6,081,165 A | 6/2000 | Goldman |
| 6,087,968 A | 7/2000 | Roza |
| 6,094,103 A | 7/2000 | Jeong et al. |
| 6,107,885 A | 8/2000 | Miguelez et al. |
| 6,122,185 A | 9/2000 | Utsunomiya et al. |
| 6,130,572 A | 10/2000 | Ghilardelli et al. |
| 6,169,444 B1 | 1/2001 | Thurber, Jr. |
| 6,188,590 B1 | 2/2001 | Chang et al. |
| 6,195,307 B1 | 2/2001 | Umezawa et al. |
| RE37,124 E | 4/2001 | Monk et al. |
| 6,226,206 B1 | 5/2001 | Maeda |
| 6,249,446 B1 | 6/2001 | Shearon et al. |
| 6,297,687 B1 | 10/2001 | Sugimura |
| 6,337,594 B1 | 1/2002 | Hwang |
| 6,339,349 B1 | 1/2002 | Rajagopalan |
| 6,356,062 B1 | 3/2002 | Elmhurst et al. |
| 6,400,211 B1 | 6/2002 | Yokomizo et al. |
| 6,411,531 B1 | 6/2002 | Nork et al. |
| 6,414,863 B1 | 7/2002 | Bayer et al. |
| 6,424,585 B1 | 7/2002 | Ooishi |
| 6,429,632 B1 | 8/2002 | Forbes et al. |
| 6,429,723 B1 | 8/2002 | Hastings |
| 6,429,730 B2 | 8/2002 | Houghton et al. |
| 6,429,732 B1 | 8/2002 | Tedrow et al. |
| 6,486,728 B2 | 11/2002 | Kleveland |
| 6,486,729 B2 | 11/2002 | Imamiya |
| 6,496,074 B1 | 12/2002 | Sowlati |
| 6,518,829 B2 | 2/2003 | Butler |
| 6,535,071 B2 | 3/2003 | Forbes |
| 6,559,689 B1 | 5/2003 | Clark |
| 6,617,933 B2 | 9/2003 | Ito et al. |
| 6,661,682 B2 | 12/2003 | Kim |
| 6,714,065 B2 | 3/2004 | Komiya et al. |
| 6,717,458 B1 | 4/2004 | Potanin |
| 6,737,926 B2 | 5/2004 | Forbes |
| 6,744,224 B2 | 6/2004 | Ishiti |
| 6,784,737 B2 | 8/2004 | Martin et al. |
| 6,788,130 B2 | 9/2004 | Pauletti et al. |
| 6,788,578 B1 | 9/2004 | Tang |
| 6,794,927 B2 | 9/2004 | Bedarida et al. |
| 6,801,076 B1 | 10/2004 | Merritt |
| 6,803,807 B2 | 10/2004 | Doi et al. |
| 6,806,761 B1 | 10/2004 | Aude |
| 6,809,603 B1 | 10/2004 | Ho |
| 6,812,775 B2 | 11/2004 | Seo |
| 6,816,000 B2 | 11/2004 | Miyamitsu |
| 6,816,001 B2 | 11/2004 | Khouri et al. |
| 6,816,016 B2 | 11/2004 | Sander et al. |
| 6,819,187 B1 | 11/2004 | Ming et al. |
| 6,819,938 B2 | 11/2004 | Sahota |
| 6,825,699 B2 | 11/2004 | Marshall et al. |
| 6,825,730 B1 | 11/2004 | Sun |
| 6,828,614 B2 | 12/2004 | Gonzalez |
| 6,831,499 B2 | 12/2004 | Oddone et al. |
| 6,831,847 B2 | 12/2004 | Perry |
| 6,833,745 B2 | 12/2004 | Hausmann et al. |

(56) References Cited

U.S. PATENT DOCUMENTS

| | | | |
|---|---|---|---|
| 6,833,752 B2 | 12/2004 | Merritt et al. | |
| 6,836,173 B1 | 12/2004 | Yang | |
| 6,836,176 B2 | 12/2004 | Zeng et al. | |
| 6,844,762 B2 | 1/2005 | Sanchez | |
| 6,847,251 B2 | 1/2005 | Kao | |
| 6,853,566 B2 | 2/2005 | Itoh | |
| 6,855,655 B2 | 2/2005 | Wagner et al. | |
| 6,856,177 B1 | 2/2005 | de Frutos et al. | |
| 6,879,502 B2 | 4/2005 | Yoshida et al. | |
| 6,897,708 B2* | 5/2005 | Hamasako | 327/536 |
| 6,906,575 B2 | 6/2005 | Tanaka | |
| 6,967,523 B2 | 11/2005 | DeMone | |
| 7,023,260 B2 | 4/2006 | Thorp et al. | |
| 7,129,796 B2 | 10/2006 | Goto | |
| 7,180,794 B2 | 2/2007 | Matsue | |
| 7,256,642 B2* | 8/2007 | Kimura | 327/537 |
| 7,382,176 B2* | 6/2008 | Ayres et al. | 327/536 |
| 7,430,133 B1 | 9/2008 | McIntyre et al. | |
| 7,486,128 B2 | 2/2009 | Yen et al. | |
| 7,551,036 B2 | 6/2009 | Berroth et al. | |
| 7,560,977 B2 | 7/2009 | Miyazaki et al. | |
| 7,649,403 B2* | 1/2010 | Lee et al. | 327/536 |
| 7,667,529 B2 | 2/2010 | Consuelo et al. | |
| 7,719,343 B2 | 5/2010 | Burgener et al. | |
| 7,724,070 B2* | 5/2010 | Fukami | 327/536 |
| 7,944,277 B1 | 5/2011 | Sinitsky et al. | |
| 7,956,675 B2 | 6/2011 | Saitoh et al. | |
| 7,969,235 B2 | 6/2011 | Pan | |
| 8,040,175 B2* | 10/2011 | Raghavan | 327/536 |
| 8,067,977 B2* | 11/2011 | Joo | 327/536 |
| 8,072,258 B2 | 12/2011 | Yamahira | |
| 8,339,185 B2* | 12/2012 | Cazzaniga et al. | 327/536 |
| 8,378,736 B2 | 2/2013 | Burgener et al. | |
| 8,497,670 B1 | 7/2013 | Molin et al. | |
| 8,674,749 B2 | 3/2014 | Tran et al. | |
| 8,686,787 B2 | 4/2014 | Swonger | |
| 8,816,659 B2 | 8/2014 | Kim et al. | |
| 8,994,452 B2 | 3/2015 | Kim et al. | |
| 9,030,248 B2 | 5/2015 | Kim et al. | |
| 9,190,902 B2 | 11/2015 | Burgener et al. | |
| 9,264,053 B2 | 2/2016 | Englekirk | |
| 2002/0140412 A1 | 10/2002 | Maneatis | |
| 2002/0153940 A1 | 10/2002 | Wurcer | |
| 2003/0002452 A1 | 1/2003 | Sahota | |
| 2003/0034849 A1 | 2/2003 | Sanduleanu et al. | |
| 2004/0080364 A1 | 4/2004 | Sander et al. | |
| 2005/0052220 A1 | 3/2005 | Burgener et al. | |
| 2006/0284670 A1 | 12/2006 | Eid et al. | |
| 2007/0069801 A1 | 3/2007 | Ragone et al. | |
| 2007/0146064 A1 | 6/2007 | Morie et al. | |
| 2008/0007980 A1 | 1/2008 | Fujiwara | |
| 2008/0030237 A1 | 2/2008 | Danioni et al. | |
| 2008/0044041 A1 | 2/2008 | Tucker | |
| 2008/0116979 A1 | 5/2008 | Lesso | |
| 2008/0272833 A1 | 11/2008 | Ivanov | |
| 2008/0272845 A1 | 11/2008 | Willassen et al. | |
| 2008/0298605 A1 | 12/2008 | Fan | |
| 2009/0066407 A1 | 3/2009 | Bowman et al. | |
| 2009/0140795 A1* | 6/2009 | Choy | 327/536 |
| 2010/0052771 A1 | 3/2010 | Hartono | |
| 2010/0245327 A1 | 9/2010 | Tsujino et al. | |
| 2011/0156819 A1 | 6/2011 | Kim et al. | |
| 2012/0038344 A1 | 2/2012 | Kim et al. | |
| 2012/0242379 A1 | 9/2012 | Obkircher et al. | |
| 2012/0286854 A1 | 11/2012 | Swonger | |
| 2013/0229841 A1 | 9/2013 | Gluliano | |
| 2013/0320955 A1 | 12/2013 | Kratyuk et al. | |
| 2014/0055194 A1 | 2/2014 | Burgener et al. | |
| 2015/0002195 A1 | 1/2015 | Englekirk | |
| 2015/0002214 A1 | 1/2015 | Englekirk | |
| 2015/0084610 A1 | 3/2015 | Kim et al. | |

FOREIGN PATENT DOCUMENTS

| | | |
|---|---|---|
| EP | 0938094 A1 | 1/1999 |
| EP | A-0 938 094 | 8/1999 |
| EP | 1664966 | 7/2006 |
| EP | 2330735 A2 | 6/2011 |
| EP | 2346169 | 7/2011 |
| EP | 2385616 A2 | 9/2011 |
| EP | 2421132 A2 | 2/2012 |
| EP | 1664966 | 7/2014 |
| EP | 2830203 | 1/2015 |
| GB | 2451524 | 2/2009 |
| JP | 01-254014 | 11/1989 |
| JP | 04-334105 | 11/1992 |
| JP | 05-111241 | 4/1993 |
| JP | 06-152334 | 5/1994 |
| JP | 08-148949 | 6/1996 |
| JP | 09-161472 | 6/1997 |
| JP | 11-252900 | 9/1999 |
| JP | 2000-166220 | 6/2000 |
| JP | 2001-051758 | 2/2001 |
| JP | 2001-119927 | 4/2001 |
| JP | 2002-119053 | 4/2002 |
| JP | 03-060451 | 2/2003 |
| JP | 03-198248 | 7/2003 |
| JP | 2005-057860 | 3/2005 |
| JP | 2006-352326 | 12/2006 |
| JP | 4524286 | 6/2010 |
| JP | 5156774 | 12/2012 |
| JP | 5675529 | 1/2015 |
| WO | WO95/23460 A1 | 8/1995 |
| WO | WO98/58382 | 12/1998 |
| WO | WO2005/043267 A2 | 5/2005 |
| WO | 2009/063661 | 5/2009 |
| WO | 2010/008586 | 1/2010 |
| WO | WO20101008586 | 1/2010 |

OTHER PUBLICATIONS

Le, Dinh Thanh, Notice of Allowance dated Jan. 2, 2015 for U.S. Appl. No. 12/460,442, 23 pgs.

Englund, Terry Lee, Advisory Action dated Jan. 6, 2015 for U.S. Appl. No. 13/769,780, 12 pgs.

Imbernon, Lisa, Extended Search Report dated Jan. 8, 2015 for appln. No. 14178741.6, 6 pgs.

Englund, Terry Lee, Final Office Action dated Jan. 20, 2015 for U.S. Appl. No. 13/932,996, 65 pgs.

Hiltunen, Thomas J., Final Office Action dated Jan. 23, 2015 for U.S. Appl. No. 13/933,006, 68 pgs.

Matsumoto, Yasunori, English translation of Office Action dated Feb. 10, 2015 for appln. No. 2012-243547. 2 pgs.

Kim, et al., Comments on Examiner's Statement of Reasons for Allowance filed in the USPTO dated Feb. 13, 2015, 3 pgs.

Englekirk, Robert Mark, Response to Final Pre-RCE Office Action filed in the USPTO dated Mar. 20, 2015 for U.S. Appl. No. 13/932,996, 14 pgs.

Englekirk, Robert Mark, Response After Final Office Action filed in the USPTO dated Mar. 23, 2015 for U.S. Appl. No. 13/933,006, 16 pgs.

Hiltunen, Thomas J., Final Office Action dated Apr. 2, 2015 for U.S. Appl. No. 13/933,006, 20 pgs.

Maxim Integrated Products, "Charge Pumps Shine in Portable Designs", published Mar. 15, 2001, 16 pgs.

Texas Instruments, "TPS60204, TPS60205, Regulated 3.3-V, 100-mA Low-Ripple Charge Pump Low Power DC/DC Converters", published Feb. 2001, Revised Sep. 2001, pp. 1-18.

Nork, Sam, "New Charge Pumps Offer Low Input and Output Noise", Linear Technology Corporation, Design Notes, Design Note 243, published Nov. 2000, 2 pgs.

Linear Technology, "LTC1550L/LTC1551L: Low Noise Charge Pump Inverters in MS8 Shrink Cell Phone Designs", published Dec. 1998, 2 pgs.

Lascari, Lance, "Accurate Phase Noise Prediction in PLL Synthesizers", Applied Microwave & Wireless, pp. 90-96, published May 2000.

(56) References Cited

OTHER PUBLICATIONS

Englund, Terry Lee, Office Action dated Dec. 1, 2004 for related U.S. Appl. No. 10/658,154, 25 pgs.
Burgener, et al., Amendment filed in the USPTO dated Apr. 1, 2005 for related U.S. Appl. No. 10/658,154, 27 pgs.
Englund, Terry Lee, Office Action dated Aug. 10, 2005 for related U.S. Appl. No. 10/658,154, 38 pgs.
Burgener, et al., Amendment filed in the USPTO dated Oct. 11, 2005 for related U.S. Appl. No. 10/658,154, 32 pgs.
Englund, Terry Lee, Advisory Action dated Nov. 2, 2005 related U.S. Appl. No. 10/658,154, 2 pgs.
Burgener, et al., Notice of Appeal filed in the USPTO dated Nov. 10, 2005 for related U.S. Appl. No. 10/658,154, 1 pg.
Englund, Terry, Office Action dated May 17, 2007 for related U.S. Appl. No. 10/658,154, 52 pgs.
Burgener, et al., Amendment filed in the USPTO dated Sep. 17, 2007 for related U.S. Appl. No. 10/658,154, 35 pgs.
Englund, Terry, Office Action dated Dec. 12, 2007 for related U.S. Appl. No. 10/658,154, 52 pgs.
Burgener, et al., Notice of Appeal, Pre-Appeal Brief Request for Review and Pre-Appeal Brief Request for Review filed in the USPTO dated May 12, 2008 for related U.S. Appl. No. 10/658,154, 9 pgs.
Englund, Terry, Interview Summary dated Oct. 9, 2009 for related U.S. Appl. No. 10/658,154, 3 pgs.
Burgener, et al., Applicants' Statement of the Substance of Telephonic Interview with Examiner Conducted Oct. 8, 2009—Summary of Proposed Claim Amendments which Examiner Agreed would Render Claims Allowable filed in the USPTO dated Nov. 9, 2009 for related U.S. Appl. No. 10/658,154, 20 pgs.
Yasuike, Kazuki, English translation of an Office Action received from the Japanese Patent Office dated Aug. 15, 2009 for related appln. No. 2006-525525, 3 pgs.
Burgener, et al., Amendment filed in the USPTO dated Dec. 2, 2009 for related U.S. Appl. No. 10/658,154, 21 pgs.
Englund, Terry, Notice of Allowance dated Jan. 11, 2010 or related U.S. Appl. No. 10/658,154, 22 pgs.
Burke, Julie, International Search Report dated Jul. 28, 2005 for related appln. No. PCT/US2004/029166, 11 pgs.
Imbernon, Lisa, Communication from the EPO dated Apr. 6, 2009 for related appln. No. 048168488, 3 pgs.
Burgener, Mark, et al., Petition for Revival of Appln. and Facts Statement filed in the USPTO for related U.S. Appl. No. 10/658,154, dated Jan. 4, 2007, 5 pgs.
Englund, Terry, Not. of Non-Compliant Appeal Brief for related U.S. Appl. No. 10/658,154, dated Nov. 2, 2006, 2 pages.
Burgener, Mark, et al., Amended Appeal Brief filed in USPTO for related U.S. Appl. No. 10/658,154, dated Jan. 5, 2007, 170 pages.
Burgener, Mark, et al., Pet. to Expedite Previous Petition filed in USPTO for related U.S. Appl. No. 10/658,154, dated Jan. 8, 2007, 6 pgs.
McLaughlin, Kenya, Decision of Petition under 37 CFR 1.137(f) for related U.S. Appl. No. 10/658,154, dated Jan. 31, 2007, 1 page.
McLaughlin, Kenya, Decision Granting for related U.S. Appl. No. 10/658,154, dated Mar. 28, 2007, 1 page.
Englund, Terry, Not. of Non-Compliant Appeal Brief for related U.S. Appl. No. 10/658,154, dated Apr. 1, 2009, 2 pages.
Burgener, Mark, et al., Amended Appeal Brief filed in USPTO for related U.S. Appl. No. 10/658,154, dated Jun.1, 2009, 175 pages.
Burgener, Mark, et al., Amendment filed in USPTO for related U.S. Appl. No. 10/658,154, dated Dec. 2, 2009, 19 pages.
Burgener, Mark, et al., Issue Fee Transmittal filed in USPTO for related U.S. Appl. No. 10/658,154, dated Mar. 23, 2010, 1 page.
Tran, Pablo N., Office Action dated Oct. 29, 2009 for related U.S. Appl. No. 11/501,125, 19 pages.
Ebner von Eschenbach, Jennifer, Communication and Supplementary Search Report dated Nov. 27, 2009 for related appln. No. 05763216.8, 10 pages.
Kai, Tetsuo, Translation of an Office Action dated Mar. 23, 2011 for related Japanese appln. No. 2010-232563, 4 pgs.

Nguyen, Hieu P., Notice of Allowance dated Jul. 8, 2014 for appln. No. 13/054,781, 61 pgs.
Peregrine Semiconductor Corporation, Response filed in the EPO dated Aug. 19, 2014 for appln. No. 09798318.3, 20 pgs.
Englekirk, Robert Mark, Response filed in the USPTO dated Aug. 25, 2014 for U.S. Appl. No. 13/932,996, 14 pgs.
Skibinski, Thomas S., Final Office Action dated Jul. 27, 2015 for U.S. Appl. No. 13/932,996, 43 pgs.
Sircus, Brian, Notification of Transmittal of International Preliminary Report on Patentability dated Aug. 10, 2011 for related application No. PCT/US2009/04149, 17 pgs.
European Patent Office, Invitation pursuant to Rule 63(1) EPC dated Aug. 19, 2011 for related appln. No. 11154275.9, 3 pgs.
Imbernon, Lisa, Communication Pursuant to Article 94(3) EPC for related appln. No. 04 816 848.8-1242, dated May 18, 2011, 5 pgs.
Tokuda, Kenji, Office Action and English translation dated Jul. 13, 2013 for related appln. No. 2011-518737, 10 pgs.
Sasaki, Satoshi, English translation of Office Action dated Jul. 23, 2013 for related appln. No. 2011-171908, 2 pgs.
Kim, et al., Response filed in the USPTO dated Oct. 11, 2013 for related U.S. Appl. No. 13/054,781, 13 pgs.
Le, Dinh Thanh, Notice of Allowance dated Nov. 7, 2013 for related U.S. Appl. No. 12/460,422, 16 pgs.
Englund, Terry Lee, Office Action dated Dec. 6, 2013 for related U.S. Appl. No. 13/769,780, 18 pgs.
Mehari, Yemane, Notice of Allowance dated Jan. 2, 2014 for related U.S. Appl. No. 13/016,875, 15 pgs.
Meulemans, Bart, Communication dated Oct. 22, 2013 for related appln. No. 11154275.9, 6 pgs.
Gentili, Luigi, Communication under Rule 71(3) EPC dated Nov. 14, 2013 for related appln. No. 04816848.8, 43 pgs.
European Patent Office, Communication pursuant to Rule 69 EPC dated Nov. 25. 2013 for related appln. No. 11154275.9, 2 pgs.
Meulemans, Bart, Supplementary Search Report received from the EPO dated Jan. 22, 2014 for related appln. No. EP09798318, 6 pgs.
Moon, et al., "Design of a Low-Distortion 22-kHz Fifth-Order Bessel Filter", IEEE Journal of Solid-State Circuits, vol. 28, No. 12, Dec. 1993, pp. 1254-1263.
Japanese Patent Office, Office Action dated Feb. 4, 2014 for related appln. No. 2012-243547, 2 pgs. (not in English).
Swonger, Preliminary Amendment and Replacement Figures filed in the USPTO dated Jul. 22, 2011, 18 pgs.
Wells, Kenneth B., Office Action dated Dec. 26, 2012 for U.S. Appl. No. 13/105,743, 6 pgs.
Swonger, Response filed in the USPTO dated Jan. 28, 2013 for U.S. Appl. No. 13/105,743, 7 pgs.
Wells, Kenneth B., Office Action dated Feb. 13, 2013 for U.S. Appl. No. 13/105,743, 55 pgs.
Swonger, Response filed in the USPTO dated Jun. 12, 2013 for U.S. Appl. No. 13/105,743, 21 pgs.
Wells, Kenneth B., Notice of Allowance dated Jul. 24, 2013 for U.S. Appl. No. 13/105,743, 10 pgs.
Wells, Kenneth B., Notice of Allowance dated Nov. 7, 2013 for U.S. Appl. No. 13/105,743, 11 pgs.
Peregrine Semiconductor Corporation, Response filed in the EPO dated Jan. 8, 2014 for appln. No. 04816848.8, 13 pgs.
European Patent Office, Communication pursuant to Rules 70(2) and 70a(2) EPC dated Feb. 14, 2014 for appln. No. 09798318.3, 1 pg.
European Patent Office, Communication under Rule 71(3) EPC dated Feb. 14, 2014 for appln. No. 04816848.8, 44 pgs.
Sakurada, Masaki, Office Action and English translation dated Mar. 4, 2014 for appln. No. 2011-171908, 10 pgs.
Le, Dinh Thanh, Notice of Allowance dated Mar. 12, 2014 for U.S. Appl. No. 12/460,442, 12 pgs.
Nguyen, Hieu P., Notice of Allowance dated Mar. 13, 2014 for U.S. Appl. No. 13/054,781, 19 pgs.
Mehari, Yemane, Notice of Allowance dated Apr. 14, 2014 for U.S. Appl. No. 13/016,875, 12 pgs.
Peregrine Semiconductor Corporation, Response filed in the JPO dated Mar. 19, 2014 for appln. No. 2012-243547, 5 pgs.
Peregrine Semiconductor Corporation, Response filed in the EPO dated May 9, 2014 for appln. No. 11154275.9, 4pgs.
Hiltunen, Thomas J., Office Action dated May 22, 2014 for U.S. Appl. No. 13/933,006, 10 pgs.
Englund, Terry Lee, Office Action dated May 23, 2014 for U.S. Appl. No. 13/932,996, 13 pgs.

(56) References Cited

OTHER PUBLICATIONS

Burgener, et al., Response filed in the USPTO dated Jun. 3, 2014 for U.S. Appl. No. 13/769,780, 17 pgs.
Peregrine Semiconductor Corporation, English translation of Response filed in the JPO dated Jun. 3, 2014 for appln. No. 2011-171908, 3 pgs.
Imbernon, L., Decision to grant a European patent pursuant to Article 97(1) EPC dated Jul. 3, 2014 for appln. No. 04816848.8, 2 pgs.
Le, Dinh Thanh, Notice of Allowance dated Jul. 8, 2014 for U.S. Appl. No. 12/460,442, 15 pgs.
Wells, Kenneth, Notice of Allowance dated May 4, 2015 for U.S. Appl. No. 13/769,780, 28 pgs.
Englekirk, Robert Mark, Response After Final Office Action filed in the USPTO dated Jun. 2, 2015 for U.S. Appl. No. 13/933,006, 17 pgs.
Hiltunen, Thomas J., Notice of Allowance dated Jun. 12, 2015 for U.S. Appl. No. 13/933,006, 17 pgs.
Peregrine Semiconductor Corporation, English translation of Response filed in the JPO on May 12, 2015 for appln. No. 2012-243547, 4 pgs.
Englund, Terry Lee, Office Action dated Apr. 5, 2011 for related U.S. Appl. No. 12/799,583, 5 pgs.
Burgener, et al., Response filed in USPTO dated Jun. 6, 2011 for related U.S. Appl. No. 12/799,583, 10 pgs.
Imbernon, Lisa, Communication Pursuant to Article 94(3) EPC dated May 18, 2011 for related appln. No. 04816848.8, 5 pgs.
Sircus, Brian, Notification of Transmittal of International Preliminary Report on Patentability dated Aug. 10, 2011 for related appln. No. PCT/US2009/04149, 17 pgs.
Tran, Pablo N., Notice of Allowance dated Oct. 6, 2011 for related U.S. Appl. No. 11/501,125, 11 pgs.
Kurzbauer, Werner, Extended European Search Report dated Dec. 6, 2011 for related appln. No. 11175503.9, 4 pgs.
Englund, Terry, Office Action dated Aug. 18, 2011 for related U.S. Appl. No. 12/799,583, 47 pgs.
Burgener, et al., Amendment filed in the USPTO dated Feb. 17, 2012 for related U.S. Appl. No. 12/799,583, 27 pgs.
Peregrine Semiconductor Corporation, Response filed in the EPO dated May 25, 2006 for related appln. No. 04816848.8-2006, 29 pgs.
Peregrine Semiconductor Corporation, Response filed in the EPO dated Mar. 9, 2010 for related appln. No. 04816848.8, 26 pgs.
Peregrine Semiconductor Corporation, Response filed in the EPO dated Nov. 28, 2011 for related appln. No. 04816848.8, 18 pgs.
Young, Lee, International Search Report dated Mar. 14, 2011 for related appln. No. PCT/ US2009/004149, 25 pgs.
Sircus, Brian, International Preliminary Report on Patentability dated Aug. 10, 2011 for related appln. No. PCT/US2009/004149, 17 pgs.
Peregrine Semiconductor Corporation, Article 19 Amendment Under Section 205(b) and Rule 46.5(b) PCT dated May 13, 2011 for related appln. No. PCT/US2009/004149, 17 pgs.
European Patent Office, Communication Pursuant to Rules 161(2) and 162 EPC dated May 19, 2011 for related appln. No. 09798318.3, 2 pgs.
Fedi, Giulio, Extended Search Report dated Mar. 5. 2012 for related appln. No. 11154277.5, 8 pgs.
Adams, W.J., et al., "OTA Extended Adjustment Range and Linearization Via Programmable Current Mirrors", Circuits and Systems, 1991, Proceedings of the 34th Midwest Symposium on Monterey, CA, USA 14-17, May 1991.
Bogdan, Pankiewicz, et al., "A Field Programmable Analog Array for CMOS Continuous-Time OTA-C Filter Applications", IEEE Journal of Solid-State Circuits, IEEE Service Center, Piscataway, NJ, USA, vol. 37, No. 2, Feb. 1, 2002.
Jader, et al., "A Linearly Tunable Low-Voltage CMOS Transconductor with Improved Common-Mode Stability and Its Application to gm-C Filters", IEEE Transactions on Circuits and Systems II: Analog and Digitalsignal Processing/ISSN 1057-7130, Institute of Electrical and Electronics Engineers Inc., vol. 48, No. 7, Jul. 1, 2001.
Peregrine Semiconductor Corporation, Response filed in the EPO dated Oct. 10, 2011 for related appln. No. 09798318.3, 3 pgs.
Peregrine Semiconductor Corporation, Response filed in the EPO dated Oct. 11, 2011 for related appln. No. 11154275.9, 11 pgs.
Peregrine Semiconductor Corporation, Response filed in the EPO dated Mar. 5. 2012 for related appln. No. 11175503.9, 19 pgs.
Englund, Terry Lee, Office Action dated Apr. 20, 2012 for related appln. No. 12/799,583, 20 pgs.
Burgener, et al., Amendment and Terminal Disclaimer filed in the USPTO dated Jun. 19, 2012 for related U.S. Appl. No. 12/799,583, 4 pgs.
Englund, Terry Lee, Notice of Allowance received from the USPTO dated Jul. 5, 2012 for related U.S. Appl. No. 12/799,583, 8 pgs.
Kurzbauer, Werner, Communication under Rule 71(3) EPC dated May 23, 2012 for related appln. No. 11175503.9-2215, 60 pgs.
Ohyama. Hirohito, Translation of Office Action of Japan Patent Office dated Aug. 7, 2012 for related appln. No. 2010-040443, 1 pg.
Peregrine Semiconductor Corporation, Response filed in the EPO dated Oct. 2, 2012 for related appln. No. 11154277.5, 14 pgs.
Englund, Terry, Notice of Allowance dated Oct. 12, 2012 for related U.S. Appl. No. 12/799,583, 26 pgs.
Nguyen, Hieu P., Office Action dated Nov. 14, 2012 for related U.S. Appl. No. 13/054,781, 5 pgs.
Mehari, Yemane, Office Action dated Mar. 15, 2013 for related U.S. Appl. No. 13/016,875, 83 pgs.
Kim, et al., Amendment—Response to Restriction Requirement filed in the USPTO dated Apr. 15, 2013 for related U.S. Appl. No. 13/054,781, 5 pgs.
Nguyen, Hieu P., Office Action dated Jun. 11, 2013 for related U.S. Appl. No. 13/054,781, 45 pgs.
Kim, et al., Amendment filed in USPTO dated Jul. 12, 2013 for related U.S. Appl. No. 13/016,875, 8 pgs.
Mehari, Yemane, Notice of Allowance dated Aug. 20, 2013 for related U.S. Appl. No. 13/016,875, 17 pgs.
Englund, Terry Lee, Final Office Action dated Sep. 18, 2014 for U.S. Appl. No. 13/769,780, 25 pgs.
European Patent Office, Communication dated Oct. 1, 2014 for appln. No. 14178741.6, 1 pg.
Nguyen, Hieu, Notice of Allowance dated Nov. 13, 2014 for U.S. Appl. No. 13/054,781, 13 pgs.
Englekirk, Robert Mark, Response filed in the USPTO dated Nov. 13, 2014 for U.S. Appl. No. 13/933,006, 12 pgs.
Peregrine Semiconductor Corporation, Response filed in the EPO dated Jul. 14, 2015 for appln. No. 14178741.6, 9 pgs.
Wells, Kenneth B., Notice of Allowance dated Sep. 4, 2015 for U.S. Appl. No. 13/769,780, 9 pgs.
Hiltunen, Thomas J., Notice of Allowance dated Oct. 8, 2015 for U.S. Appl. No. 13/933,006, 9 pgs.
Englekirk, Robert Mark, Response filed in the USPTO dated Oct. 27, 2015 for U.S. Appl. No. 13/932,996, 12 pgs.
Skibinski, Thomas S., Final Office Action dated Nov. 9, 2015 for U.S. Appl. No. 13/932,996, 31 pgs.
Nguyen, Hieu P., Office Action dated Dec. 30, 2015 for U.S. Appl. No. 14/638,954, 6 pgs.
Suzuki, Shigeyuki, English Translation of Office Action received from the Jpo dated 212116 for appln. No. 2014-260387, 3 pgs.
Englekirk, Robert Mark, Amendment After Final Office Action filed in the USPTO dated Feb. 9, 2016 for U.S. Appl. No. 13/932,996, 17 pgs.
Mehari, Yemane, Notice of Allowance received from the USPTO dated Feb. 17, 2016 for U.S. Appl. No. 14/462,193, 37 pgs.
Mehari, Yemane, Notice of Allowance received from the USPTO dated Mar. 29, 2016 for U.S. Appl. No. 14/462,193, 17 pgs.
Skibinsky, Thomas, Advisory Action received from the USPTO dated Feb. 23, 2016 for U.S. Appl. No. 13/932,996, 8 pgs.
Kim, et al., Response to Restriction Requirement filed in the USPTO dated Feb. 29, 2016 for U.S. Appl. No. 14/638,954, 8 pgs.
Skibinsky, Thomas, Notice of Allowance received from the USPTO dated Mar. 11, 2016 for U.S. Appl. No. 13/932,996, 13 ps.
Hiltunen, Thomas T., Office Action received from the USPTO dated Apr. 14, 2016 for U.S. Appl. No. 14/911,577, 13 pgs.

\* cited by examiner

1 - MMMP plate
2 - MMMP edge
3 - 12V pos pump
4 - 12V neg pump
5 - 50V H sync pump
6 - 50V R sync pump
7 - 50V I sync pump
8 - 50V I plain pump
9 - 50V PG plain pump

| vdd | RN open I | RN open V | RN 1MΩ I | RN 1MΩ V | RN short I | RN short V |
|---|---|---|---|---|---|---|
| 2.0 | 0 | 35.4 | 0.00000797 | 7.97 | 9.00E-06 | 0 |
| 2.5 | 0 | 43.73 | 0.00001354 | 13.54 | 1.59E-05 | 0 |
| 3.0 | 0 | 52.07 | 0.00002066 | 20.66 | 2.36E-05 | 0 |

| vdd | HN open I | HN open V | HN 1MΩ I | HN 1MΩ V | HN short I | HN short V |
|---|---|---|---|---|---|---|
| 2.0 | 0 | 26.46 | 0.00001016 | 10.16 | 1.31E-05 | 0 |
| 2.5 | 0 | 35.46 | 0.00001505 | 15.05 | 2.11E-05 | 0 |
| 3.0 | 0 | 42.28 | 0.00002013 | 20.13 | 3.09E-05 | 0 |

| vdd | IN open I | IN open V | IN 1MΩ I | IN 1MΩ V | IN short I | IN short V |
|-----|-----------|-----------|----------|----------|------------|------------|
| 2.0 | 0 | 25.5 | 0.0000052 | 5.20E+00 | 6.70E-06 | 0 |
| 2.5 | 0 | 35.8 | 0.0000081 | 8.10E+00 | 1.10E-05 | 0 |
| 3.0 | 0 | 44.6 | 0.0000113 | 1.13E+01 | 1.60E-05 | 0 |

HIGH VOLTAGE RING PUMP WITH INVERTER STAGES AND VOLTAGE BOOSTING STAGES

CROSS REFERENCE TO RELATED APPLICATIONS

Claim of Priority

This application is a divisional application of U.S. application Ser. No. 13/105,743, "High Voltage Ring Pump with Inverter Stages and Voltage Boosting Stages", filed May 11, 2011, now U.S. Pat. No. 8,686,787; the contents of U.S. application Ser. No. 13/105,743 are incorporated by reference herein in its entirety.

FIELD

The disclosure relates generally to electronic integrated circuits. More specifically, it relates to a high voltage ring pump.

BACKGROUND

Given the number and complexity of components on any integrated circuit (IC), it is rarely the case that all of these components can function optimally using a single voltage supply. However, the use of many different voltage supplies, whether external or internal to the IC, may be undesirable. Additional external voltage supplies required in order for the IC to operate correctly may be inconvenient for the user of the IC. Additional voltage supplies internal to the IC may violate area requirements of a chip.

Consequently, a common method by which to generate the different voltage supplies required by each of the components is to build auxiliary circuitry onto the IC that generates the different voltages. A charge pump is one such auxiliary circuit that functions as a DC to DC converter. The charge pump takes in an input voltage and generates an output voltage that is either higher in magnitude or lower in magnitude than the input voltage, depending on the application required. Charge pumps generally utilize an energy storage element to generate the output voltage.

SUMMARY

According to a first aspect of the disclosure, a circuital arrangement adapted to provide voltage to a load circuit is provided, comprising a plurality of charge pumps, wherein each charge pump comprises an inverter stage and a voltage boosting stage, the circuital arrangement thus comprising: a plurality of inverter stages ring connected therebetween; and a plurality of voltage boosting stages serially connected therebetween.

According to a second aspect of the disclosure, a charge pump element is provided, comprising: an initial inverter, wherein an input voltage to the initial inverter is inverted to obtain a complementary output voltage; at least one pump block, wherein an output voltage of a particular pump block in the at least one pump block is larger in magnitude than an input voltage to the particular pump block in the at least one pump block; and a driving circuit connected with the initial inverter on one end and the at least one pump block on another end, wherein the driving circuit generates a first voltage and a second voltage based on the input voltage to the initial inverter, and wherein each of the first and second voltages are adapted to be applied to the at least one pump block.

According to a third aspect of the disclosure, a circuital arrangement adapted to provide an output voltage to a load circuit is provided, comprising: a plurality of inverter stages ring connected therebetween; and a plurality of voltage boosting stages serially connected therebetween, wherein: each voltage boosting stage is coupled with one inverter stage in the plurality of inverter stages, an output of a voltage boosting stage in the plurality of voltage boosting stages is higher in magnitude than an output of a previous voltage boosting stage in the plurality of voltage boosting stages, and a last voltage boosting stage in the plurality of voltage boosting stages is adapted to provide the output voltage to the load circuit.

According to a fourth aspect of the disclosure, a method for boosting voltage is provided, comprising: generating a first oscillating signal; generating a second oscillating signal complementary to the first oscillating signal; and accumulating voltage based on the first oscillating signal and the second oscillating signal.

Further embodiments are provided in the specification, drawings, and claims of the present application.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

DETAILED DESCRIPTION

Throughout the present disclosure, a charge pump will sometimes be referred to as a "pump". According to several embodiments of the present disclosure, full-wave pumps, also referred to as FWPumps, are described. An FWPump is a charge pump comprising a full-wave bridge rectifier. Additionally, the present disclosure will discuss, with reference to the accompanying figures, operation and embodiments of a ring pump. The ring pump comprises a plurality of charge pumps and is adapted to provide an output voltage to a load circuit. In accordance with several embodiments of the present disclosure, a ring pump comprises an odd plurality of FWPumps connected in a ring connection. Alternatively, a ring pump may comprise an even plurality of FWPumps and an odd number of inverters. Such an inverter can precede or follow an FWPump or be connected between two FWPumps. Consequently, a stage of the ring pump, as used throughout the present disclosure, can comprise either an FWPump or simply an inverter.

Figure 1:
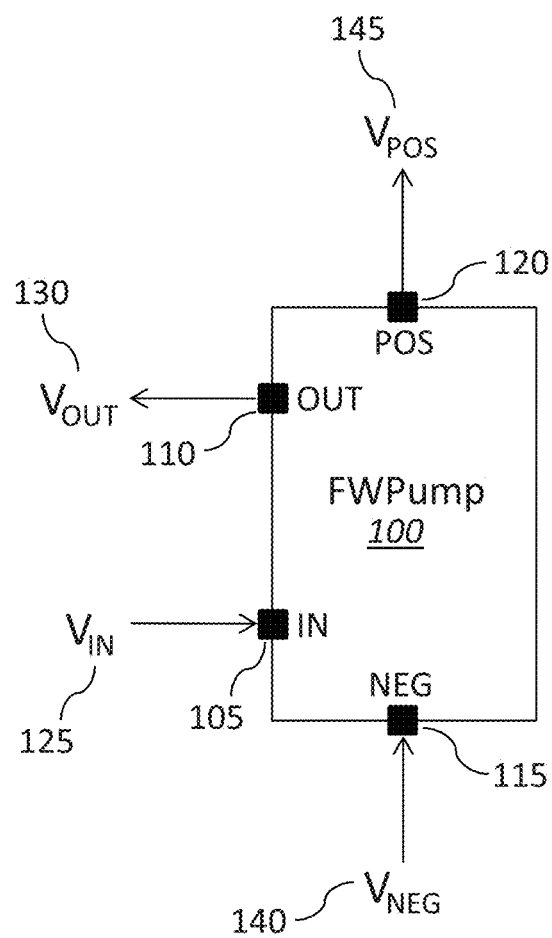
FIG. 1 shows an exemplary diagram of an individual full-wave pump element and illustrates input terminals and output terminals of the individual full-wave pump element.

FIG. 1 shows an exemplary diagram of an individual FWPump (100) element. The FWPump (100) is a four terminal device with two inputs and two outputs. In particular, the FWPump (100) comprises an IN terminal (105) that takes in a first input voltage $V_{IN}$ (125), an OUT terminal (110) that sends out a first output voltage $V_{OUT}$ (130), a NEG terminal (115) that takes in a second input voltage $V_{NEG}$ (140), and a POS terminal (120) that sends out a second output voltage $V_{POS}$ (145). The four terminals (105, 110, 115, 120) of the FWPump (100) will be discussed in detail in relation to FIGS. 2, 3A, and 3B.

Figure 2:
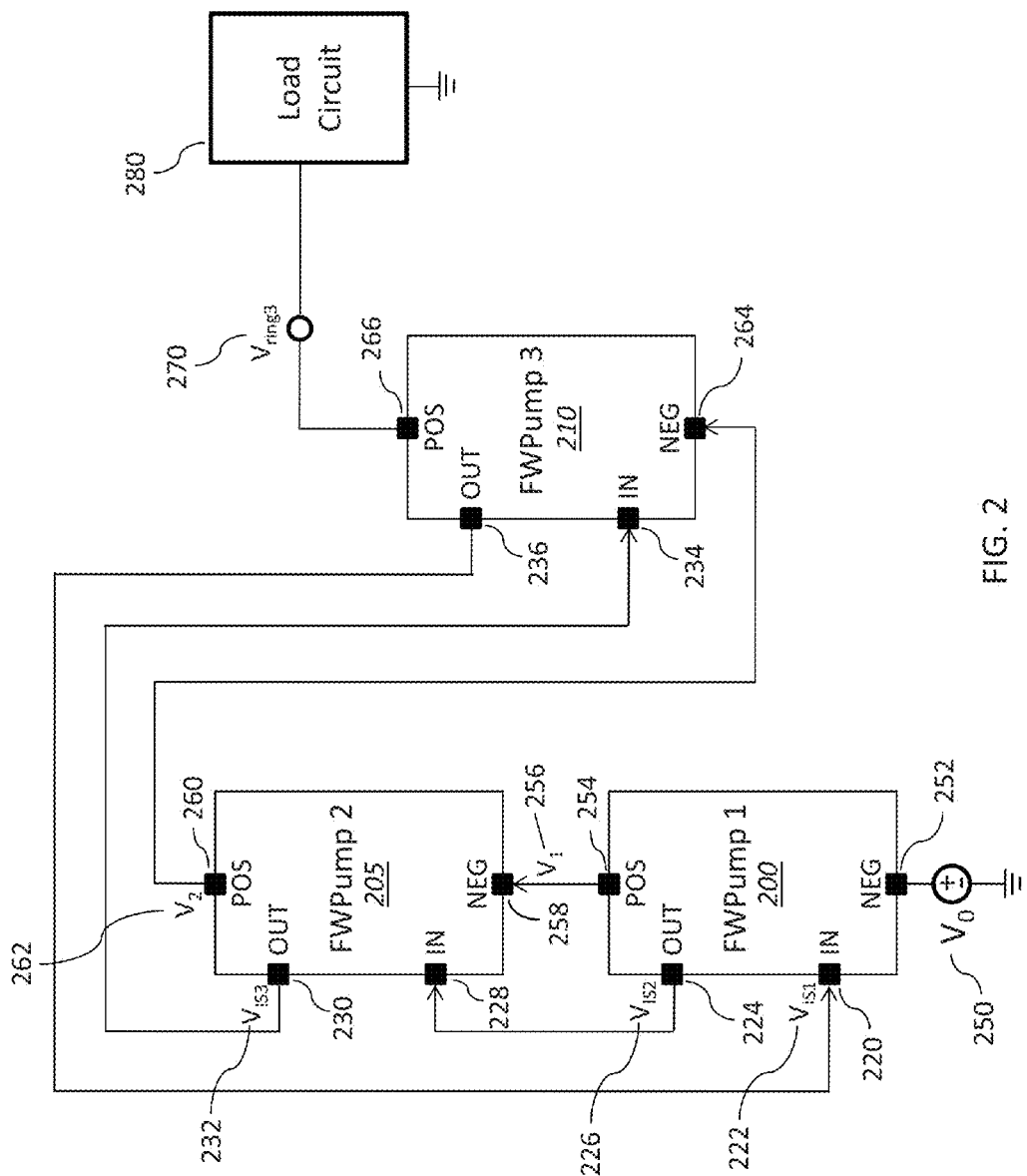
FIG. 2 shows a schematic of a ring pump according to an embodiment of the disclosure.

FIG. 2 shows an embodiment of a ring pump. In particular, FIG. 2 shows an exemplary three-stage ring pump. The three-stage ring pump comprises a first FWPump (200), a second FWPump (205), and a third FWPump (210). Each FWPump (200, 205, 210) comprises an inverter stage and a voltage boosting stage, the implementations of which are not shown directly in FIG. 2 and will be discussed in detail in relation to FIGS. 3A and 3B. As shown in FIG. 2, the ring pump thus comprises a plurality of ring connected inverter stages and a plurality of serially connected voltage boosting stages.

By way of example and not of limitation, assume that a positive oscillator supply voltage $V_{DD}$=+2 V and a negative oscillator supply voltage $V_{SS}$=−1 V are applied to inverters (not shown) in the FWPumps (200, 205, 210). The inverters are thus adapted to have a high voltage state of +2 V and a low voltage state of −1 V in this example. Consequently, voltage swing is given by $V_{DD}-V_{SS}$=+3 V. It should be noted that the terms "positive" and "negative" are not used to designate absolute polarity but are rather used to designate a relationship between $V_{DD}$ and $V_{SS}$, specifically that $V_{DD} > V_{SS}$. For instance, $V_{SS}$ can be 0 V, which is not a negative voltage.

The inverter stage in each FWPump (200, 205, 210) is performed as follows. Consider a first inverter stage voltage $V_{IS1}$ (222) that is initially, and arbitrarily, set to $V_{IS1}$=+2V; the voltage $V_{IS1}$ (222) is the voltage applied to the first FWPump's IN terminal (220). The inverter stage of the first FWPump (200) will invert voltage state of the voltage $V_{IS1}$ (222) to a complementary voltage state and output the resulting voltage as a second inverter stage voltage $V_{IS2}$ (226). Consequently, in the present example, the voltage $V_{IS2}$ (226) is $V_{IS2}$=−1 V. The first FWPump's (200) OUT terminal (224) serially connects to the second FWPump's (205) IN terminal (228) and thus the input voltage applied to the second FWPump's (205) IN terminal (228) is the voltage $V_{IS2}$ (226).

The inverter stage of the second FWPump (205) inverts voltage state of the voltage $V_{IS2}$ (226) and outputs the resulting voltage as a third inverter stage voltage $V_{IS3}$ (232). In the present example, the voltage $V_{IS3}$ (232) is $V_{IS3}$=+2 V. The second FWPump's (205) OUT terminal (230) serially connects to the third FWPump's (210) IN terminal (234) and thus the input voltage applied to the third FWPump's IN terminal (234) is the voltage $V_{IS3}$ (232).

The inverter stage of the third FWPump (210) inverts voltage state of the voltage $V_{IS3}$ (232). As seen in FIG. 2, the third FWPump's (210) OUT terminal (236) serially connects to the first FWPump's (200) IN terminal (220). Therefore, the voltage Visa (222) is $V_{IS1}$=−1 V, which is opposite in voltage state to the initial value of $V_{IS1}$ (222).

The inverter stages of the three FWPumps (200, 205, 210) of FIG. 2 are connected in a ring structure. The ring connection formed by the inverter stage of each individual FWPump (100 in FIG. 1) is henceforth referred to as an inverter ring. Although a three-stage ring pump is shown in FIG. 2, the skilled person in the art would have no trouble increasing the number of stages in the ring pump.

With further reference to FIG. 2, in addition to the inverter stage, each FWPump (200, 205, 210) further comprises the voltage boosting stage, where (as will be shown with reference to FIGS. 3A and 3B) the voltage boosting stage is a function of (depends on) voltages of the inverter stage. Consider an initial voltage $V_0$ (250) that is of an arbitrary value and is connected to the first FWPump's (200) NEG terminal (252). The voltage boosting stage of the first FWPump (200) will take the initial voltage $V_0$ (250) and increase the voltage (in magnitude). The resulting voltage is a first voltage boosting stage voltage $V_1$ (256), where $|V_1|>|V_0|$. The voltage $V_1$ (256) is the voltage at the first FWPump's (200) POS terminal (254).

Since the first FWPump's (200) POS terminal (254) is serially connected to the second FWPump's (205) NEG terminal (258), the voltage $V_1$ (256) is the voltage input into the second FWPump's (205) NEG terminal (258). The voltage boosting stage of the second FWPump (205) will take the voltage $V_1$ (256) and increase the voltage (in magnitude). Thus, the resulting voltage is a second voltage boosting stage voltage $V_2$ (262), where $|V_2|>|V_1|$.

The voltage $V_2$ (262) is the voltage at the second FWPump's (205) POS terminal (260) and the third FWPump's (210) NEG terminal (264). The voltage boosting stage of the third FWPump (210) increases the magnitude of the voltage $V_2$ (262). The resulting voltage is a ring pump output voltage $V_{ring3}$ (270), where $|V_{ring3}|>|V_2|$. The voltage $V_{ring3}$ (270) is the voltage at the third FWPump's (210) POS terminal (266). Since the embodiment in FIG. 2 only has three stages, the voltage $V_{ring3}$ (270) is the output voltage of the ring pump, which is the voltage applied to an arbitrary load circuit (280).

In several embodiments of the present disclosure, the voltage boosting stage of each FWPump increases voltage in a positive direction. In relation to the ring pump shown in FIG. 2, the relative values of the voltages are given by $V_{ring3}>V_2>V_1>V_0$.

Specifically, the first FWPump (200) in FIG. 2 sits on a pedestal voltage given by the initial voltage $V_0$ (250) and generates the first voltage boosting stage voltage $V_1$ (256). The first voltage $V_1$ (256) is the initial voltage $V_0$ (250)

boosted by the voltage swing $V_{DD}-V_{SS}$. Consequently, the first voltage $V_1$ (256) is given by $V_1=V_0+(V_{DD}-V_{SS})$.

Similarly, the second FWPump (205) in FIG. 2 sits on a pedestal voltage given by the first voltage $V_1$ (256) and generates the second voltage boosting stage voltage $V_2$ (262). The second voltage $V_2$ (262) is the first voltage $V_1$ (256) boosted by the voltage swing $V_{DD}-V_{SS}$. Therefore, the second voltage $V_2$ (262) is given by $V_2=V_1+(V_{DD}-V_{SS})=V_0+2(V_{DD}-V_{SS})$.

Finally, the third FWPump (210) in FIG. 2 sits on a pedestal voltage given by the second voltage $V_2$ (262) and generates the ring pump output voltage $V_{ring3}$ (270). The output voltage $V_{ring3}$ (270) is boosted by the voltage swing and thus $V_{ring3}=V_2+(V_{DD}-V_{SS})=V_1+2(V_{DD}-V_{SS})=V_0+3(V_{DD}-V_{SS})$.

As a numerical example, consider that $V_{DD}=+2$ V, $V_{SS}=-1$ V, and $V_0=0$ V. The three voltage boosting stage voltages (256, 262, 270) are $V_1=3$ V, $V_2=6$ V, and $V_{ring3}=9$ V. Taking into consideration losses associated with each of the components used to implement an FWPump (200, 205, 210), each of the voltages $V_1$ (256), $V_2$ (262), and $V_{ring3}$ (270) will generally be lower than those values given above.

In another embodiment of the present disclosure, the voltage boosting stage of each FWPump increases voltage in a negative direction. Using the ring pump in FIG. 2 as an example, in order for the voltage boosting stage of each FWPump (200, 205, 210) to increase voltage in a negative direction, the NEG terminal (252, 258, 264) and the POS terminal (254, 260, 266) of each FWPump (200, 205, 210) are flipped for each FWPump (200, 205, 210). The relative values of the voltages in this case are given by $V_0>V_1>V_2>V_{ring3}$. Equivalently, to increase voltage in the negative direction, the POS terminals (254, 260, 266) and NEG terminals (252, 258, 264) may remain as they appear in FIG. 2, but the initial voltage $V_0$ (250) would instead be tied to the third FWPump's POS terminal (266) while the load circuit (280) would be tied to the first FWPump's NEG terminal (252).

Figure 3A:
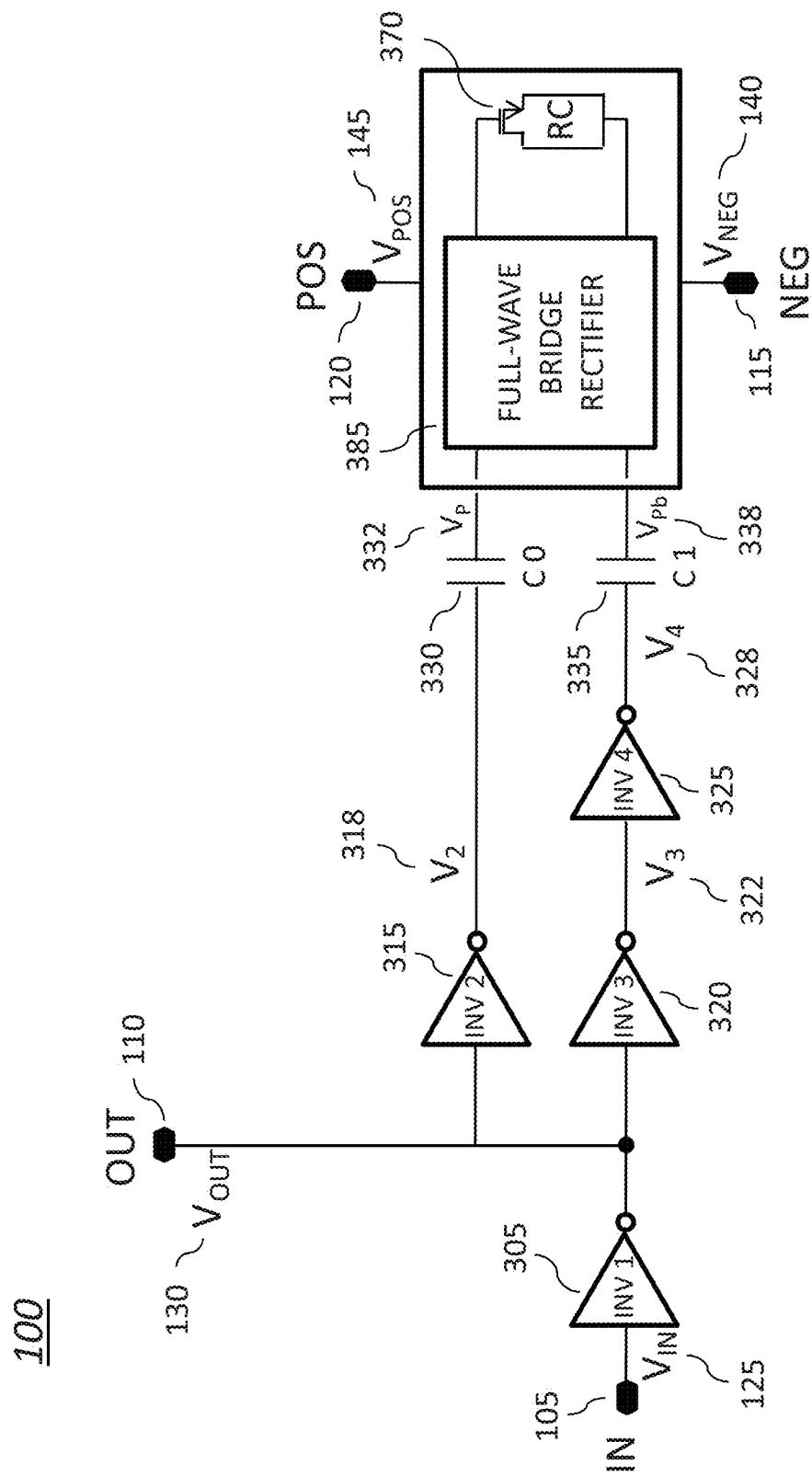
FIG. 3A shows a block diagram that illustrates components of the individual full-wave pump element according to an embodiment of the disclosure.
Figure 3B:
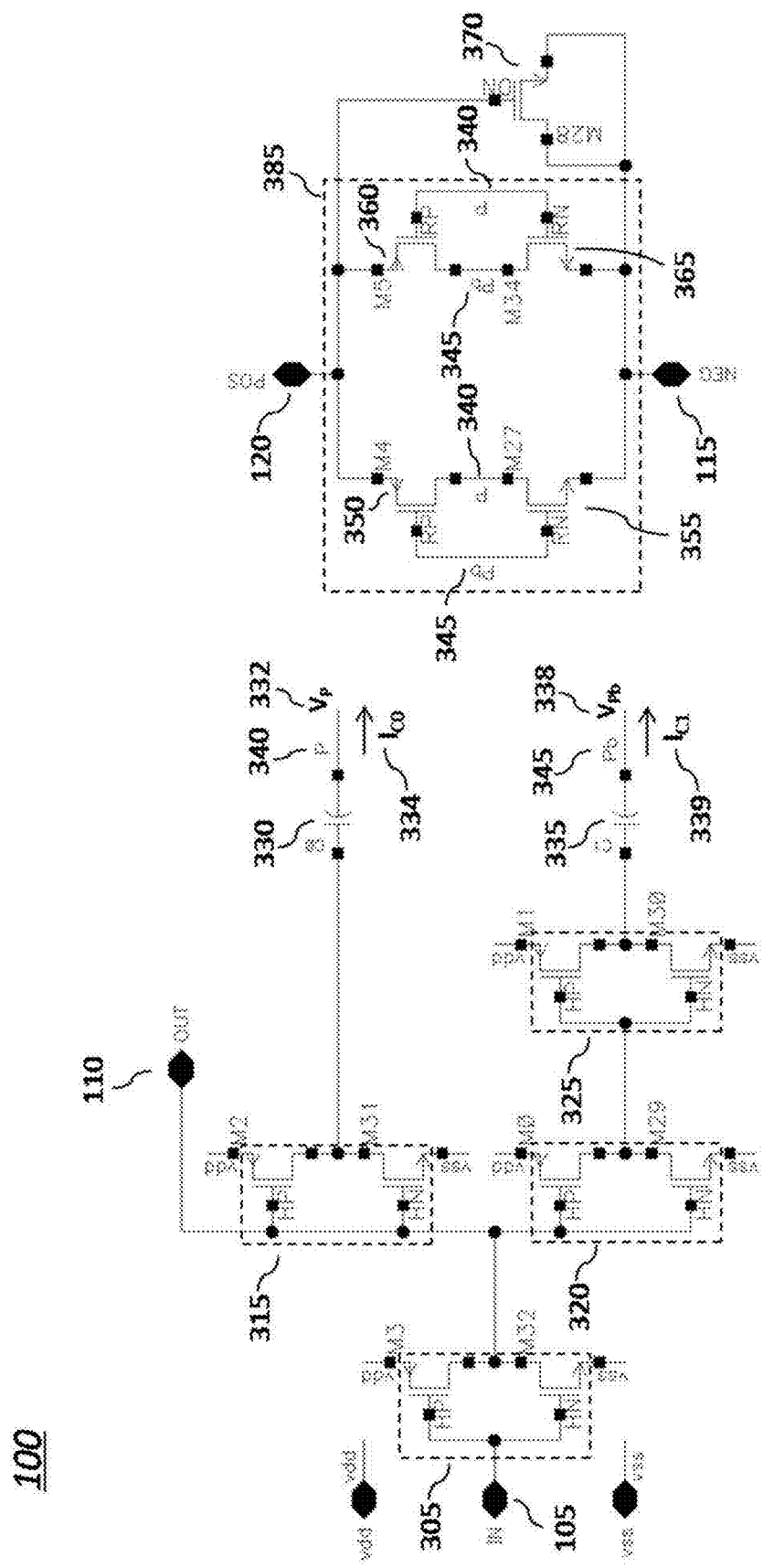
FIG. 3B shows a possible arrangement of components that implements the individual full-wave pump element shown in FIG. 3A.

The actual operation of the ring pump in FIG. 2 will become clear when the ring pump in FIG. 2 is explained in relation to FIGS. 3A and 3B.

FIG. 3A shows a block diagram that illustrates a possible implementation of the FWPump (100) element shown in FIG. 1, according to an embodiment of the present disclosure. Terminals IN (105), OUT (110), NEG (115), and POS (120) shown in FIG. 3A refer to the same terminals (105, 110, 115, 120) as those shown in FIG. 1. Similarly, voltages $V_{IN}$ (125), $V_{OUT}$ (130), $V_{NEG}$ (140), and $V_{POS}$ (145) shown in FIG. 3A refer to the same voltages (125, 130, 140, 145) as those shown in FIG. 1. Consequently, the same reference numerals are used to refer to the terminals (105, 110, 115, 120) and the voltages (125, 130, 140, 145) in both figures.

The FWPump (100) comprises an inverter stage. Operation of the inverter stage is as follows and is made with reference to FIG. 3A. The IN terminal (105) of the FWPump (100) takes as its input the output of a previous FWPump's OUT terminal (not shown in FIG. 3A). The input voltage $V_{IN}$ (125) is sent into a first inverter (305), which inverts the input voltage $V_{IN}$ (125) and sends the resulting output voltage $V_{OUT}$ (130) to a next FWPump (not shown in FIG. 3A) via the OUT terminal (110). The voltage state of the output voltage $V_{OUT}$ (130) is opposite the voltage state of the input voltage $V_{IN}$ (125). Consequently, the first inverter (305) implements the inverter stage of the individual FWPump (100).

The FWPump (100) further comprises a voltage boosting stage. FIG. 3A shows possible components used to implement the voltage boosting stage. All components shown in FIG. 3A, including the first inverter (305) used in the inverter stage of the FWPump (100), are used in the voltage boosting stage. Overall operation of the voltage boosting stage is as follows. The NEG terminal (115) of the FWPump (100) takes as its input the output of the previous FWPump's POS terminal (not shown), which is the voltage $V_{NEG}$ (140) shown in FIG. 3A. After the voltage boosting stage of the FWPump (100) is completed, the FWPump (100) will output the voltage $V_{POS}$ (145) at the POS terminal (120), where $|V_{POS}|>|V_{NEG}|$.

With continued reference to FIG. 3A, general operation with reference to each component in the voltage boosting stage will now follow. The output voltage $V_{OUT}$ (130) of the first inverter (305) is sent into a second inverter (315) serially connected to the first inverter (305). Voltage state of the second inverter's output voltage $V_2$ (318) is the same as voltage state of the original input voltage $V_{IN}$ (125). Similarly, the output voltage $V_{OUT}$ (130) of the first inverter (305) is also sent into a third inverter (320), which results in a third inverter's output voltage $V_3$ (322) with a same voltage state as that of the input voltage $V_{IN}$ (125). The voltage $V_3$ (322) is the input to a fourth inverter (325). The fourth inverter (325) inverts the voltage $V_3$ (322) and outputs a fourth inverter's output voltage $V_4$ (328) with a voltage state opposite that of the voltage $V_3$ (322) and thus a voltage state opposite that of the original input voltage $V_{IN}$ (125). In summary, if the input voltage $V_{IN}$ (125) is arbitrarily set to the high voltage state, then the voltages $V_{IN}$ (125), $V_2$ (318), and $V_3$ (322) are in the high voltage state and the voltages $V_{OUT}$ (130) and $V_4$ (328) are in the low voltage state.

The outputs of the second inverter (315) and the fourth inverter (325) are applied to a first DC blocking capacitor (330) and a second DC blocking capacitor (335), respectively. The DC blocking capacitors (330, 335) are connected to a full-wave bridge rectifier (385). The full-wave bridge rectifier (385) is connected, in turn, to a reservoir capacitor (370). The FWPump's (100) NEG terminal (115) and POS terminal (120) are directly tied to a circuit comprising the full-wave bridge rectifier (385) and the reservoir capacitor (370). Consequently, the voltage boosting stage of each FWPump (100) is a function of voltages involved in the voltage boosting stage due to connection between the inverter stage of each FWPump (100) to the voltage boosting stage of the FWPump (100) via the first and second DC blocking capacitors (330, 335). Operation of the DC blocking capacitors (330, 335), full-wave bridge rectifier (385), and reservoir capacitor (370) will be discussed in relation to FIG. 3B.

The reservoir capacitor (370) of each FWPump (100) functions as a charge storage device for storing charges generated by the voltage boosting stage of each FWPump (100). It should be noted that although the term "capacitor" is used, the reservoir capacitor (370) need only be any component that has an impedance that is more capacitive than resistive or inductive. In selecting a reservoir capacitor (370), threshold voltage (when using FETs as capacitors) and breakdown voltage are exemplary parameters. A DN FET, as shown in FIGS. 3A and 3B, is only one possible implementation of the reservoir capacitor (370).

The operation of the ring pump with reference to the three-stage ring pump shown in FIG. 2 and the embodiment of the FWPump (100) shown in FIG. 3A will now be described.

Consider, as before, that the inverters have a positive oscillator supply voltage $V_{DD}=+2$ V and a negative oscillator supply voltage $V_{SS}=-1$ V. The inverters are adapted to have a high voltage state of $+2$ V and a low voltage state of $-1$ V. It should be noted that values used for the supply voltages $V_{DD}$ and $V_{SS}$ can differ from example values given in the present disclosure. Depending on the application, the positive supply voltage $V_{DD}$ could be, for instance, 3.3 V or 2.5 V, while the negative supply voltage $V_{SS}$ could be tied to ground.

Consider a first iteration through the ring pump in FIG. 2 where the first inverter stage voltage $V_{IS1}$ (222) is set to an exemplary value of +2 V. As previously mentioned, the resulting second inverter stage voltage $V_{IS2}$ (226) and third inverter stage voltage $V_{IS3}$ (232) are −1 V and +2 V, respectively. The third inverter stage voltage $V_{IS3}$ (232) is inverted by the third FWPump (210), yielding a voltage of −1 V. Since the third FWPump's (210) OUT terminal (236) serially connects to the first FWPump's (200) IN terminal (220), the −1 V is the value of the first inverter stage voltage $V_{IS1}$ (222). Consequently, in a second iteration through the inverter ring, the resulting inverter stage voltages $V_{IS1}$ (222), $V_{IS2}$ (226), and $V_{IS3}$ (232) are −1 V, +2 V, and −1 V, respectively.

Each inverter stage voltage (222, 226, 232) changes voltage states in the second iteration relative to the corresponding inverter stage voltage (222, 226, 232) in the first iteration. Consequently, each iteration through the inverter stages of each FWPump (200, 205, 210) will reverse voltage state of the inverter stage voltages (222, 226, 232). The values for the inverter stage voltages (222, 226, 232) will not stabilize as a result of there being an odd number of stages.

As seen in relation to FIG. 3A, the input voltage $V_{IN}$ (125) for the inverter stage of the FWPump (100) is used to drive the voltage boosting stage. The voltage $V_2$ (318) is applied to the first capacitor (330). The voltage $V_4$ (322), which is in an opposite voltage state relative to the voltage $V_2$ (318), is applied to the second capacitor (335).

The input voltage $V_{IN}$ (125) is set to the voltage $V_{IS1}$ (222 in FIG. 2). The voltage $V_{IS1}$ (222 in FIG. 2) reverses voltage state with each iteration through the inverter ring. Consequently, the voltages $V_2$ (318), $V_3$ (322), and $V_4$ (328) also reverse voltage states with each iteration. The reversing of the voltage state for voltages $V_2$ (318) and $V_4$ (328) creates the equivalent of an AC signal at the first capacitor (330) and the second capacitor (335), respectively. A first capacitor voltage output $V_P$ (332) is the output of the first capacitor (330). A second capacitor voltage output $V_{Pb}$ (338) is the output of the second capacitor (335).

Both the first capacitor (330) and the second capacitor (335) are connected to the full-wave bridge rectifier (385) and thus both voltages $V_P$ (332) and $V_{Pb}$ (338) are applied to the full-wave bridge rectifier (385). In a first state, the voltage $V_P$ (332) is larger than the voltage $V_{Pb}$ (338). In a second state, the voltage $V_{Pb}$ (338) is larger than the voltage $V_P$ (332). It will be shown in relation to FIG. 3B that in both the first state and the second state, the full-wave bridge rectifier (385) will charge up the reservoir capacitor (370). Since the inverter ring of the ring pump prevents the input voltage $V_{IN}$ (125) at the IN terminal (105) of each FWPump (100) from stabilizing, each iteration through the inverter ring will serve to charge up the reservoir capacitor (370).

The reservoir capacitor (370) functions as follows in relation to voltage boosting. The FWPump (100) has the voltage $V_{NEG}$ (140) applied to its NEG terminal (115), where the voltage $V_{NEG}$ (140) is an output voltage of the voltage boosting stage of the previous FWPump (not shown). The voltages $V_P$ (332) and $V_{Pb}$ (338) applied to the full-wave bridge rectifier (385) will charge up the reservoir capacitor (370) of the FWPump (100). The voltage $V_{NEG}$ (140) is applied to both the full-wave bridge rectifier (385) and the reservoir capacitor (370). The value of the output voltage $V_{POS}$ (145) of the FWPump (100) is the sum of the input voltage $V_{NEG}$ (140) and a voltage value that quantifies charge stored by the reservoir capacitor (370). Consequently, after the voltage boosting stage of the FWPump (100), the output voltage $V_{POS}$ (145) of the FWPump (100) is greater in magnitude than the input voltage $V_{NEG}$ (140) of the FWPump (100).

With continued reference to FIG. 3A, it should be noted that all components of the individual FWPump (100) to the right of the first inverter (305) aid in buffering the OUT terminal (110) from these other components. Buffering refers to isolation (reduction in coupling) between AC loads and AC signals. Specifically, the inverters (315, 320, 325) buffer the $V_{OUT}$ (130), which oscillates between the supply voltages $V_{DD}$ and $V_{SS}$, from loading as well as from variability in power delivery from the supply voltages $V_{DD}$ and $V_{SS}$. This buffering allows the inverter ring to run at a high and constant speed, without regard to the other activities, specifically the activities of the voltage boosting stage, occurring within the individual FWPump (100). Specifically, without buffering, oscillation frequency of the inverter ring fluctuates due to coupling between the inverter stage and the voltage boosting stage, and fluctuation of the oscillation frequency reduces speed of the inverter ring and voltage output of each FWPump (100) in a ring pump.

The first and second DC blocking capacitors (330, 335) provide DC isolation by preventing DC current from leaking back from the reservoir capacitor (370) to the first and second DC blocking capacitors (330, 335). Specifically, the first and second DC blocking capacitors (330, 335) provide the isolation between the inverter ring, which is associated with lower voltages, and activities of the voltage boosting stage, which can be associated with higher voltages, by preventing DC coupling between the various inverters (305, 315, 320, 325), shown to the left of the capacitors (330, 335), and the full-wave bridge rectifier (385) and the reservoir capacitor (370), shown to the right of the capacitors (330, 335). Consequently, output power of the ring pump would be drawn from the NEG terminal (115) and the POS terminal (120) of each FWPump (100) and little (if any) power would be drawn from the inverters (305, 315, 320, 325) in the inverter stage. Without DC isolation between the inverter and voltage boosting stages, the full-wave bridge rectifier (385) may draw current from the OUT terminal (110), which can affect voltage multiplication obtained through stacking of the voltage boosting stages.

FIG. 3B shows a circuit schematic that illustrates circuit components that may be used to implement each of the blocks in the block diagram on FIG. 3A. The details in the circuit schematic and circuit components are specific to a particular semiconductor process utilized in the present disclosure, but the skilled person can adjust details to fit different semiconductor parameters.

The exemplary process of FIG. 3B includes the following FET types, from which a majority of circuit components are fabricated. By way of example, N-channel FETs include: regular N ("RN") FETs that have a nominal threshold voltage of 450 mV, high doping N ("HN") FETs that have a nominal threshold voltage of 700 mV, and depletion mode N ("DN") FETs that have a threshold voltage below 0 V. Corresponding P-channel FETs include regular P FETs ("RP") that have a nominal threshold voltage of −400 mV and high doping FETs ("HP") that have a nominal threshold voltage of −600 mV. In another embodiment of the present disclosure, HN, RN, HP, and RP FETs may have nominal threshold voltages of 800 mV, 300 mV, −800 mV, and −300 mV, respectively. Other FETs, such as an intrinsic N-channel ("IN") FET can be utilized. The IN FET may have a threshold voltage of approximately 0 V. Additional parameters in selecting a particular FET as the charge storage device include, by way of example and not of limitation, series resistance and density of capacitance of the particular FET.

In the embodiment shown in FIG. 3B, the first inverter (305), the second inverter (315), the third inverter (320), and the fourth inverter (325) are all implemented using HP FETs and HN FETs. The full-wave bridge rectifier (385) is implemented using RP FETs and RN FETs. It should be noted, however, that the full-wave bridge rectifier (385) can also be implemented using diodes as well as various other devices, identifiable by the skilled person in the art, capable of rectifying action. The reservoir capacitor (370) is implemented using a DN FET. Selection of a particular type of N-channel FET and P-channel FET depends primarily on different threshold voltages of each type of FET. Each FET used to implement the inverters (305, 315, 320, 325) is supplied with a positive voltage supply $V_{DD}$ and a negative voltage supply $V_{SS}$.

It is to be understood that MOS transistors are used as switches in this particular embodiment, as seen in the implementation of the various inverters (305, 315, 320, 325) and the full-wave bridge rectifier (385). An alternative embodiment of the ring pump may utilize, for instance, diodes or diode-connected transistors as switches in an implementation of the full-wave bridge rectifier (385). Similarly, it is to be noted again that DN FETs are used as reservoir capacitors (370) in this embodiment. However, any passive element that has an impedance that is more capacitive than inductive or resistive at the frequency of interest may serve as a capacitor in this disclosure.

With continued reference to FIG. 3B, the output of the first capacitor (330) is denoted as node P (340). Node P (340) is connected to the drain of a first PMOS (350) and the drain of a first NMOS (355); node P (340) is also connected to the gate of a second PMOS (360) and the gate of a second NMOS (365). The output of the second capacitor (335) is denoted as node Pb (345). Node Pb (345) is connected to the gate of the first PMOS (350) and the gate of the first NMOS (355); node Pb (345) is also connected to the drain of the second PMOS (360) and the drain of the second NMOS (365). The source of the first PMOS (350) and the source of the second PMOS (360) are connected; both the source of the first PMOS (350) and the source of the second PMOS (360) are tied to the POS terminal (120). The source of the first NMOS (355) and the source of the second NMOS (365) are also connected; both the source of the first NMOS (355) and the source of the second NMOS (365) are tied to the NEG terminal (115). These components and connections are used to implement the embodiment of the full-wave bridge rectifier (385) shown in FIG. 3B.

A simplified description of the operation of the full-wave rectifier circuit (385) is given as follows. Consider a first state when the P node (340) is at a higher voltage than the Pb node (345), the first PMOS (350) and the second NMOS (365) are switched on whereas the first NMOS (355) and the second PMOS (360) are switched off. The transistors that are switched on, henceforth referred to as conducting transistors, charge up the reservoir capacitor (370).

Similarly, consider a second state when the Pb node (345) is at a higher voltage than the P node (340), the first NMOS (355) and the second PMOS (360) are switched on whereas the first PMOS (350) and the second NMOS (365) are switched off. The conducting transistors again charge up the reservoir capacitor (370). Consequently, the reservoir capacitor (370) is being charged during the times when the P node (340) is at a higher voltage than the Pb node (345), and vice versa.

Rectifying nature of the full-wave bridge rectifier (385) produces unidirectional current flow. In other words, charge is delivered in a direction of a load circuit (such as 280 in FIG. 2) regardless of whether the P node (340) has a higher voltage than the Pb node (345), or vice versa.

Output voltage waveforms from the first state and second state are generally designed to be complementary to each other. In several embodiments of the present disclosure, the complementary voltage waveforms result from utilizing same capacitance values for both capacitors (330, 335) and applying the same two voltages $V_{DD}$ and $V_{SS}$ to both capacitors (330, 335), where inputs to the capacitors (330, 335) are different voltage states selected from two voltage states $V_{DD}$ and $V_{SS}$. Specifically, one capacitor (330, 335) has an applied voltage of $V_{DD}$ when the other capacitor (330, 335) has an applied voltage of $V_{SS}$, and vice versa. Providing such symmetry in the capacitance and voltage values is one method to reduce noise and promote voltage balance in each FWPump.

Consequently, according to many embodiments of the present disclosure, the ring pump accumulates or boosts voltage by generating a first oscillating signal to be applied to one capacitor (330, 335) and a second oscillating signal complementary to the first oscillating signal to be applied to the other capacitor (330, 335). As shown for example in FIGS. 3A and 3B, the second oscillating signal can be generated by inverting the first oscillating signal. The ring pump accumulates or boosts voltage based on the first and second oscillating signals provided to the voltage boosting stages of the FWPumps that form the ring pump.

Voltage across each of the capacitors (330, 335) changes by around the voltage swing $|V_{DD}-V_{SS}|$ between transitions from the high voltage state $V_{DD}$ and the low voltage state $V_{SS}$. Consider a case where the first capacitor (330) transitions from the high voltage state $V_{DD}$ to the low voltage state $V_{SS}$ while the second capacitor (335) transitions from the low voltage state $V_{SS}$ to the high voltage state $V_{DD}$. A first charge pulse of amplitude $Q=C(V_{SS}-V_{DD})$ passes through the first capacitor (330) and a second charge pulse of amplitude $Q=C(V_{DD}-V_{SS})$ passes through the second capacitor (335), resulting in a first capacitor current $I_{C0}$ (334) and a second capacitor current $I_{C1}$ (339), respectively. These charge pulses are sent through the full-wave rectifier bridge (385) and into the reservoir capacitor (370).

A low ripple voltage arises from application of the full-wave bridge rectifier (385) and the complementary voltage waveforms of the capacitors (330, 335). Since the voltage waveforms are complementary, the first capacitor current $I_{C0}$ (334) and second capacitor current $I_{C1}$ (339) are equal in magnitude and opposite in sign. Due to the equal magnitude of the currents (334, 339), no net charge comes from the NEG terminal (115) and the POS terminal (120) regardless of whether the P node (340) has a higher voltage than the Pb node (345), or vice versa. Consequently, the reservoir capacitor (370) of the individual FWPump (100) is charged by the voltage boosting stage of the individual FWPump (100) itself, without taking charge from a previous FWPump (not shown) via the NEG terminal (115) or from a subsequent FWPump (not shown) via the POS terminal (120).

Additionally, transition of the voltages (from $V_{DD}$ to $V_{SS}$ and vice versa) through the inverter ring spreads charge transfer events over time from the capacitors (330, 335) to the reservoir capacitor (370). For example, with reference to the three-stage ring pump shown in FIG. 2, the charge transfer events are due to six charge pulses, where one pulse comes from each of the first and second capacitors (330, 335 in FIGS. 3A and 3B) of each of the three FWPumps (200, 205, 210). Alternatively, consider a single charge pump that can supply one single charge pulse that is equal in magnitude to the sum of the six charge pulses. The single large charge transfer event yields high amplitude charge impulses which can produce undesirable noise in the ring pump output voltage $V_{ring3}$ (270) as well as the supply voltages $V_{DD}$ and $V_{SS}$. By spreading the pulses across three stages (or N stages in the general case) and running the stages at a high frequency, the charge transfer events become overlapped and appear nearly DC, as shown, for instance, in output voltage versus time plots in subsequent FIGS. 8B and 8D. The output voltage of the ring pump quantifies the charge transfer events.

In the present embodiment shown in FIG. 3B, the DN FET used to implement the reservoir capacitor (370) in the individual FWPump (100) is generally larger in size than the other transistors, henceforth referred to as active devices, used in the implementation of the ring pump. Note that capacitance of the reservoir capacitor (370) allows current flow toward a load circuit (such as 280 in FIG. 2). To the contrary, parasitic capacitances cause current flow through various conducting paths, and thus such current is lost to the load circuit (280 in FIG. 2). Parasitic capacitances include parasitic gate-to-drain capacitance $C_{gd}$ and parasitic gate-to-source capacitance $C_{gs}$ of the active devices. By making the size of the DN FET used to implement the reservoir capacitor (370) large compared to the active devices, the capacitance of the reservoir capacitor (370) in each individual FWPump (100) is much larger than the parasitic capacitances of the active devices, thus lowering effect of the parasitic capacitances.

Additionally, it should be noted that the switching action of the active devices is an abrupt process. The abrupt process leads to a rapid charge transfer that gets pushed through the POS terminal (120) of each individual FWPump (100). The larger capacitance of the reservoir capacitor (370) tends to prevent the rapid charge transfers incurred by the switching action of the active devices. By smoothing out these rapid charge transfers, current sent to the load circuit (280 in FIG. 2) is more gradual, which generally leads to higher voltage output.

Furthermore, it should be noted that although an FWPump element (100) comprises an inverter stage and a voltage boosting stage, the first inverter (305) shown in FIGS. 3A and 3B may be utilized as the inverter stage for one or more FWPump elements. In an embodiment of the present disclosure, use of a single ring phase in the inverter ring, where a single ring phase comprises the various inverters (305, 315, 320, 325) in the inverter stage, to drive multiple DC capacitors (330, 335), full-wave bridge rectifiers (385), and reservoir capacitors (370) of the multiple voltage boosting stages allows for high ring pump output voltage. The high ring pump output voltage results from stacking of the DC capacitors (330, 335), full-wave bridge rectifier (385), and reservoir capacitor (370) of multiple voltage boosting stages that share the same inverter stage. In addition to the high ring pump output voltage, the ring pump may also run at higher frequencies due to effectiveness of filtering and charge delivery. Specifically, pulsed delivery of charge is integrated onto the reservoir capacitor (370) subsequent to filtering provided by the buffering and the DC isolation. This filtering reduces or removes an AC component of power pulses and aids in accumulation of DC energy.

In another embodiment, instead of utilizing a single ring phase to drive multiple voltage boosting stages, a first inverter (305) can be utilized to drive the various inverters (315, 320, 325) in multiple inverter stages as well as the DC capacitors (330, 335), full-wave bridge rectifier (385), and reservoir capacitor (370) of the multiple voltage boosting stages that share the same first inverter (305).

Voltage multiplication, performed by stacked DC capacitors (330, 335), full-wave bridge rectifiers (385), and reservoir capacitors (370) that share a first inverter (305) or a single ring phase, is a function of number of stacked DC capacitors (330, 335), full-wave bridge rectifiers (385), and reservoir capacitors (370). Current yielded by these stacked components (330, 335, 370, 385) is a function of number of transitions per unit time (frequency) of the ring pump, which is proportional to 1/N where N is the number of stages (to be specifically described in the following example).

By way of example, consider a seven-stage ring pump, where each stage drives three lineups of DC capacitors (330, 335), full-wave bridge rectifiers (385), and reservoir capacitors (370). In this case, a "stage" of the ring pump comprises the various inverters (305, 315, 320, 325) and the three lineups of DC capacitors (330, 335), full-wave bridge rectifiers (385), and reservoir capacitors (370). Output voltage delivered by this seven-stage ring pump will be nearly equal to output voltage delivered by a twenty-one stage ring pump, where each inverter stage in the twenty-one stage ring pump is associated with one voltage boosting stage. However, output current of the seven-stage ring pump will be nearly three times output current of the twenty-one stage ring pump due to the seven-stage ring pump having an oscillation frequency three times the oscillation frequency of the twenty-one stage ring pump. The seven-stage ring pump of this example generally generates more voltage ripple than the twenty-one stage ring pump as a result of charge delivery pulses being aggregated at three times a per-pulse charge delivery. The per-pulse charge delivery refers to the case where each lineup of DC capacitor pair (330, 335), full-wave bridge rectifier (385), and reservoir capacitor (370) has its own set of inverters (305, 315, 320, 325).

Figure 4A:
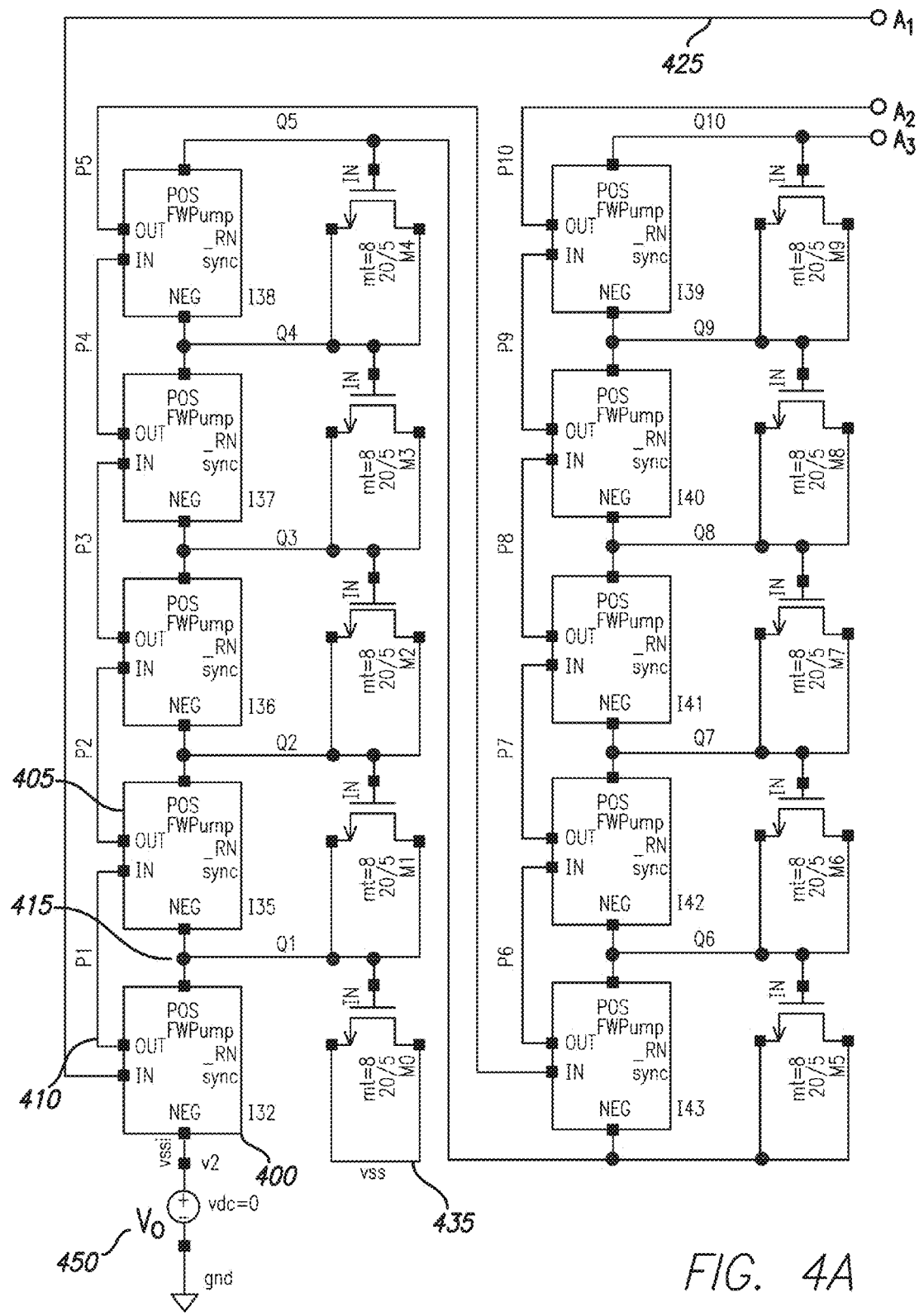
FIGS. 4A-4C show a schematic of the ring pump according to another embodiment in the disclosure. Specifically, connecting the components between FIGS. 4A and 4B and between FIGS. 4B and 4C provides the ring pump.
Figure 4B:
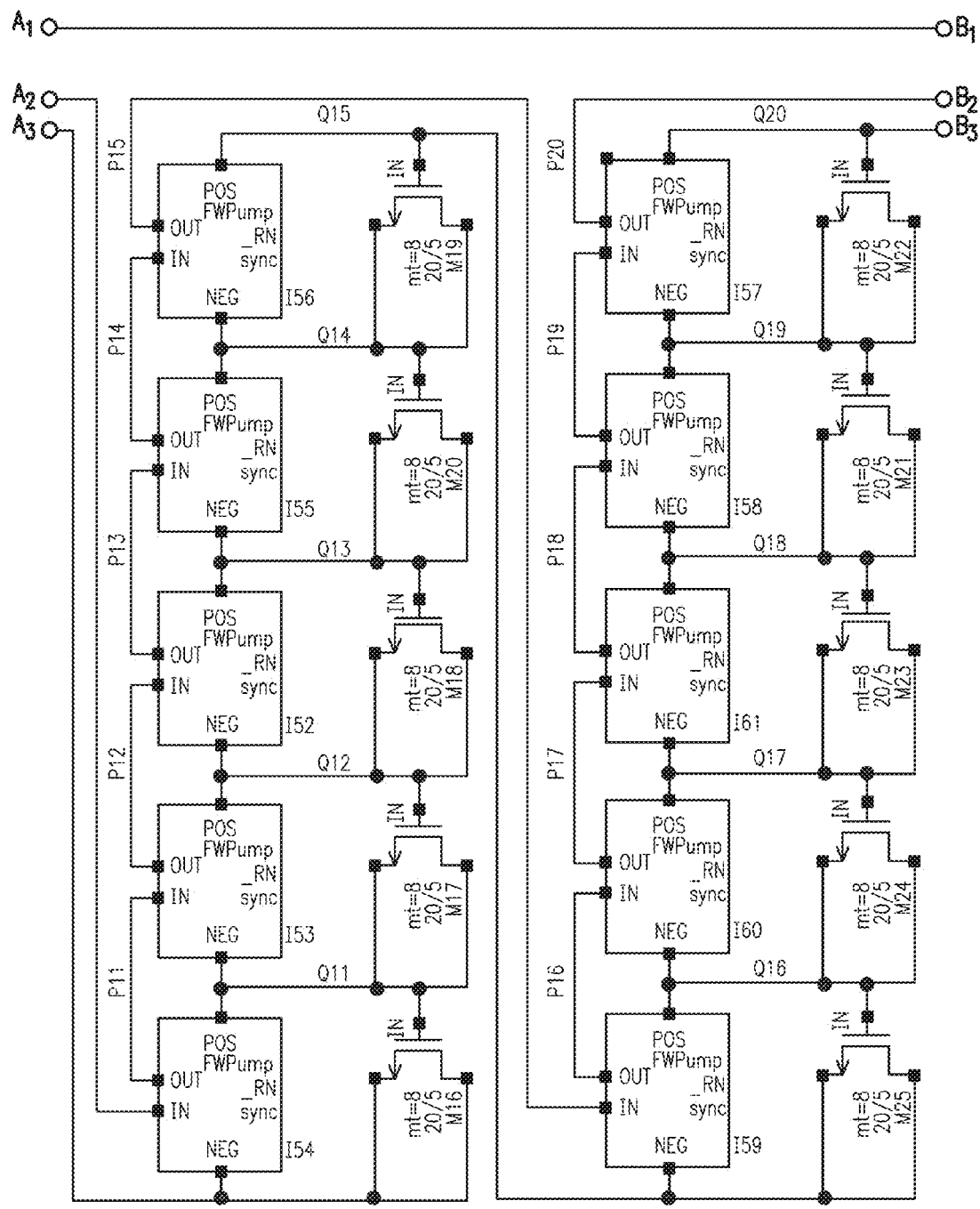
Figure 4C:
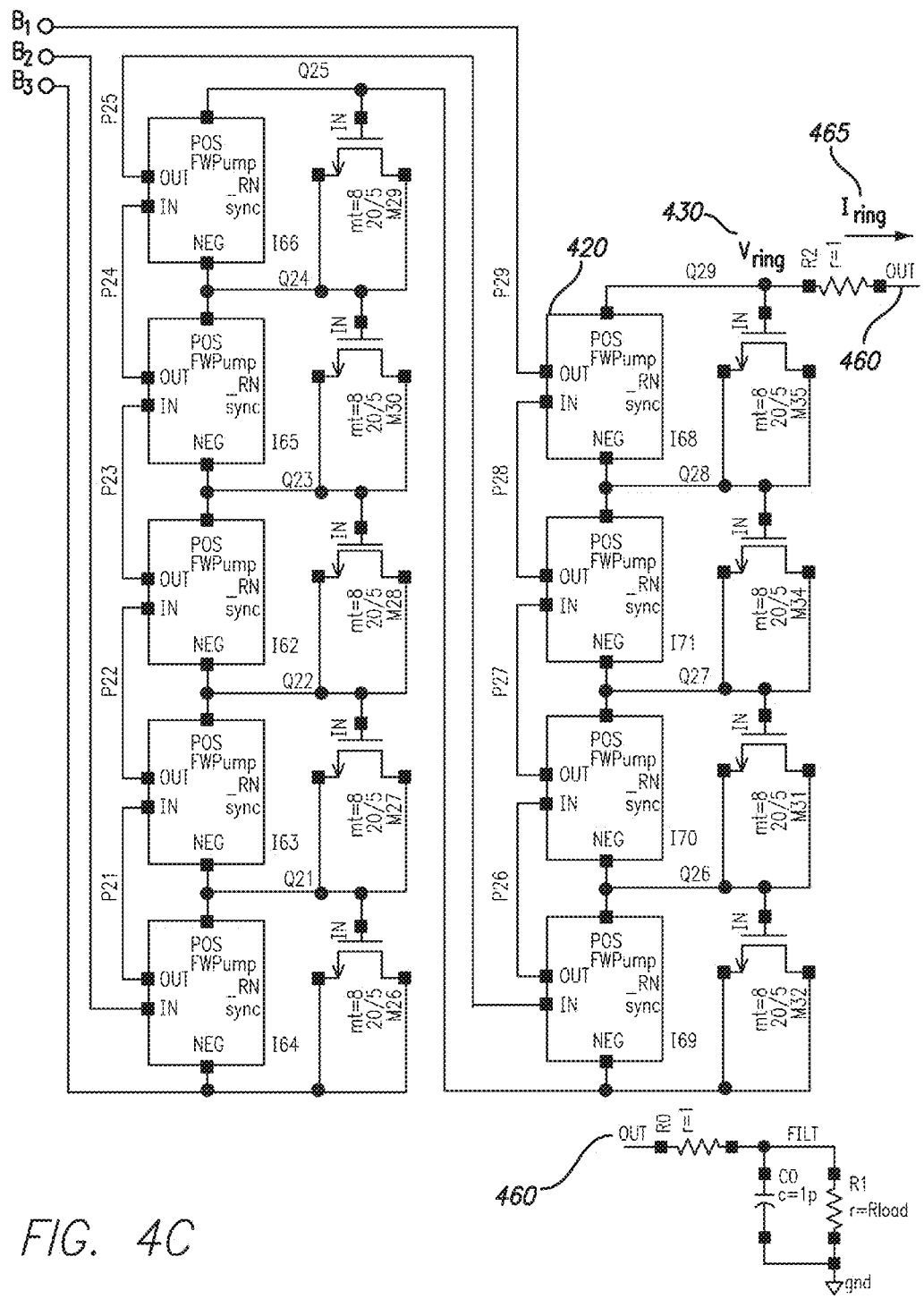

FIGS. 4A-4C show another embodiment of a ring pump. Specifically, connecting components between FIGS. 4A-4B and between FIGS. 4B-4C provide the ring pump. In the particular embodiment shown in FIGS. 4A-4C, the ring pump comprises twenty-nine individual FWPumps. The components and operation of the individual FWPump were previously described in detail with reference to FIGS. 1, 2, 3A, and 3B.

Aside from the number of stages in the ring pump, operation of the ring pumps in FIGS. 2 and 4A-4C is generally the same. The inverter ring for the embodiment in FIGS. 4A-4C is as follows. The OUT terminal of a first FWPump (400 in FIG. 4A) is connected to the IN terminal of a second FWPump (405 in FIG. 4A) by a serial connection (410 in FIG. 4A). Similar serial connections are made between the IN terminal and OUT terminal of adjacent FWPumps. To complete the inverter ring of the ring pump, the OUT terminal of a last FWPump (420 in FIG. 4C) is connected to the first FWPump (400 in FIG. 4A) by a serial connection (425 in FIG. 4A).

The voltage boosting stages of the ring pump are as follows. An initial voltage $V_0$ (450 in FIG. 4A) is applied to the NEG terminal of the first FWPump (400 in FIG. 4A). The POS terminal of the first FWPump (400 in FIG. 4A) is connected to the NEG terminal of the second FWPump (405 in FIG. 4A) by a serial connection (415 in FIG. 4A). Similar serial connections are made between the NEG terminal and the POS terminal of adjacent FWPumps. At the last FWPump (420 in FIG. 4C), a ring pump output voltage $V_{ring}$ (430 in FIG. 4C) is applied to a load circuit (460 in FIG. 4C). The load circuit (460 in FIG. 4C) can comprise any combination of components and interconnections between these components and is not part of the ring pump itself. In FIG. 4C, the load circuit (460 in FIG. 4C) is a simple RC circuit.

A decrease in the ring pump output voltage $V_{ring}$ (430 in FIG. 4C) will result from charge drawn by the load circuit (460 in FIG. 4C). By supplying charge to the load circuit (460 in FIG. 4C), charge stored by a reservoir capacitor (not shown) of the last FWPump (420 in FIG. 4C) decreases. Charge from reservoir capacitors (not shown) of preceding FWPumps flows toward the reservoir capacitor of the last FWPump (420 in FIG. 4C) to charge up the reservoir capacitor of the last FWPump (420 in FIG. 4C). The iterations through the inverter ring will drive the voltage boosting stage of each FWPump such that the pump output voltage $V_{ring}$ (430 in FIG. 4C) increases back toward the voltage at which the output $V_{ring}$ (430 in FIG. 4C) saturates.

Also, in the embodiment in FIGS. 4A-4C, an external IN FET (435 in FIG. 4A) is placed in parallel to each FWPump. The external IN FET (435 in FIG. 4A) functions as a smoothing capacitor that further lowers the ripple of the voltage $V_{POS}$ output from the voltage boosting stage of each FWPump. Additional size of the ring pump due to the presence of the external IN FETs (435 in FIG. 4A) is deemed small enough to tolerate the addition.

In general, the output voltage Van, (430 in FIG. 4C) saturates at around $V_{ring} \approx V_0 + N \times (V_{DD} - V_{SS})$, where N is the number of stages in the ring pump. For the embodiment shown in FIGS. 4A-4C, the ring pump has N=29 stages. Consider, as before, that $V_0$=0 V, $V_{DD}$=+2 V, and $V_{SS}$=−1 V, the output voltage would be $V_{ring} \approx 87$ V. An actual measurement of the output voltage $V_{ring}$ (430 in FIG. 4C) would generally be lower due to losses associated with each of the components of the ring pump. Addition of more stages in the ring pump would generally yield higher output ring pump voltage $V_{ring}$ (430 in FIG. 4C).

An output current $I_{ring}$ (465 in FIG. 4C) to the load circuit (460 in FIG. 4C) is given by an equation $I_{ring} = V_{ring}/R_{load} = 2f_{osc}C_0(V_{DD}-V_{SS})$, where $R_{load}$ is an equivalent resistance of the load circuit (460 in FIG. 4C), $C_0$ is a capacitance value of the first and second capacitors (330, 335), and $f_{osc}$ is an oscillation frequency of the inverter ring. As with the output voltage $V_{ring}$ (430 in FIG. 4C), an actual measurement of the output current $I_{ring}$ (465 in FIG. 4C) would generally be lower than that calculated from the equation due to losses associated with each of the components of the ring pump.

As previously discussed and as observed from the equation, higher capacitances for the first and second capacitors (330, 335) yield higher output voltage $V_{ring}$ (430 in FIG. 4C) and current $I_{ring}$ (465 in FIG. 4C). Additionally, the equation shows a reason that oscillation frequency is generally kept at or near a constant value. Changes in the oscillation frequency $f_{osc}$ which relates to changes in time between transition from a high voltage state to a low voltage state (or vice versa), causes changes in the output voltage $V_{ring}$ (430 in FIG. 4C) and current $I_{ring}$ (465 in FIG. 4C). Additionally, changes in the oscillation frequency $f_{osc}$ causes changes in output voltage noise and power consumption of the ring pump, which lowers the output voltage $V_{ring}$ (430 in FIG. 4C) and current $I_{ring}$ (465 in FIG. 4C) of the ring pump. Voltage per stage, given by $|V_{DD}-V_{SS}|$, is generally independent of oscillation frequency. However, should cycle time (equivalently, inverse of the oscillation frequency) approach an RC time constant of the full-wave rectifier bridge (385) and the reservoir capacitor (370) (shown in FIGS. 3A and 3B), not all charge $Q = C|V_{DD}-V_{SS}|$ would have transferred from the first and second capacitors (330, 335) to the full-wave rectifier bridge (385) and the reservoir capacitor (370) prior to reversal of voltage states.

Figure 5:
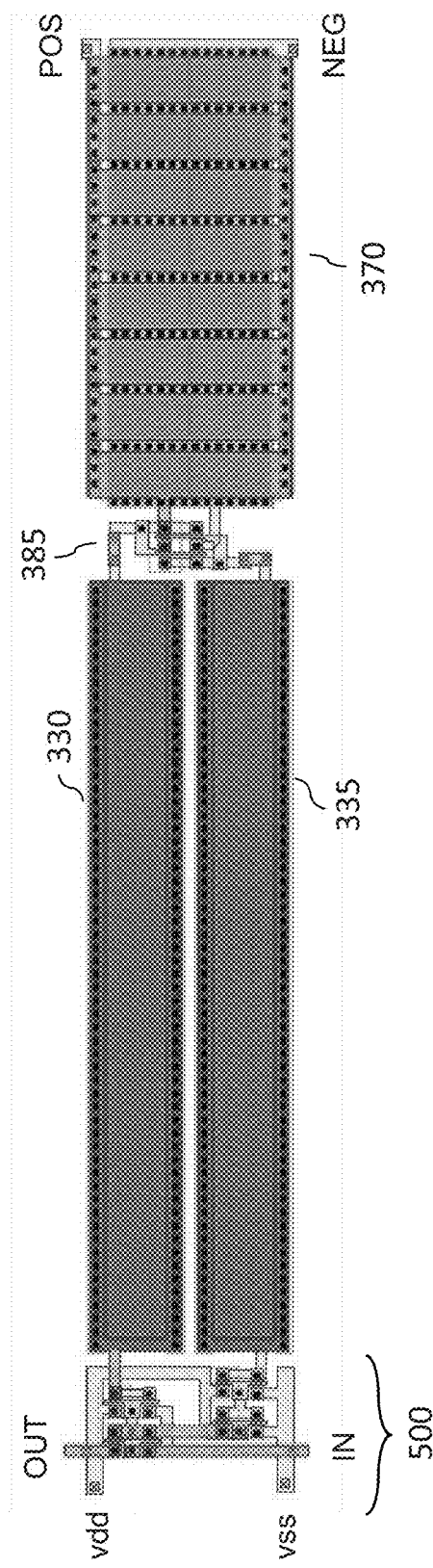
FIG. 5 shows a top view of a circuit layout of an individual full-wave pump element.

FIG. 5 shows a top view of a circuit layout of an individual FWPump. FIG. 5 shows the various components shown in FIGS. 3A and 3B. Circuitry (500) on the left side of FIG. 5 contains the various inverters (305, 315, 320, 325) shown in FIGS. 3A and 3B. Using the same reference numerals as in FIGS. 3A and 3B for equivalent component components, FIG. 5 also shows the first and second capacitors (330, 335), the full-wave bridge rectifier (385), and the reservoir capacitor (370). The layout of the individual FWPump, as shown in FIG. 5, is used to implement each FWPump in the ring pump shown in FIGS. 4A-4C. Voltage waveforms obtained from this ring pump, which include effects of parasitic elements, are shown in FIGS. 8C and 8D.

Figure 6:
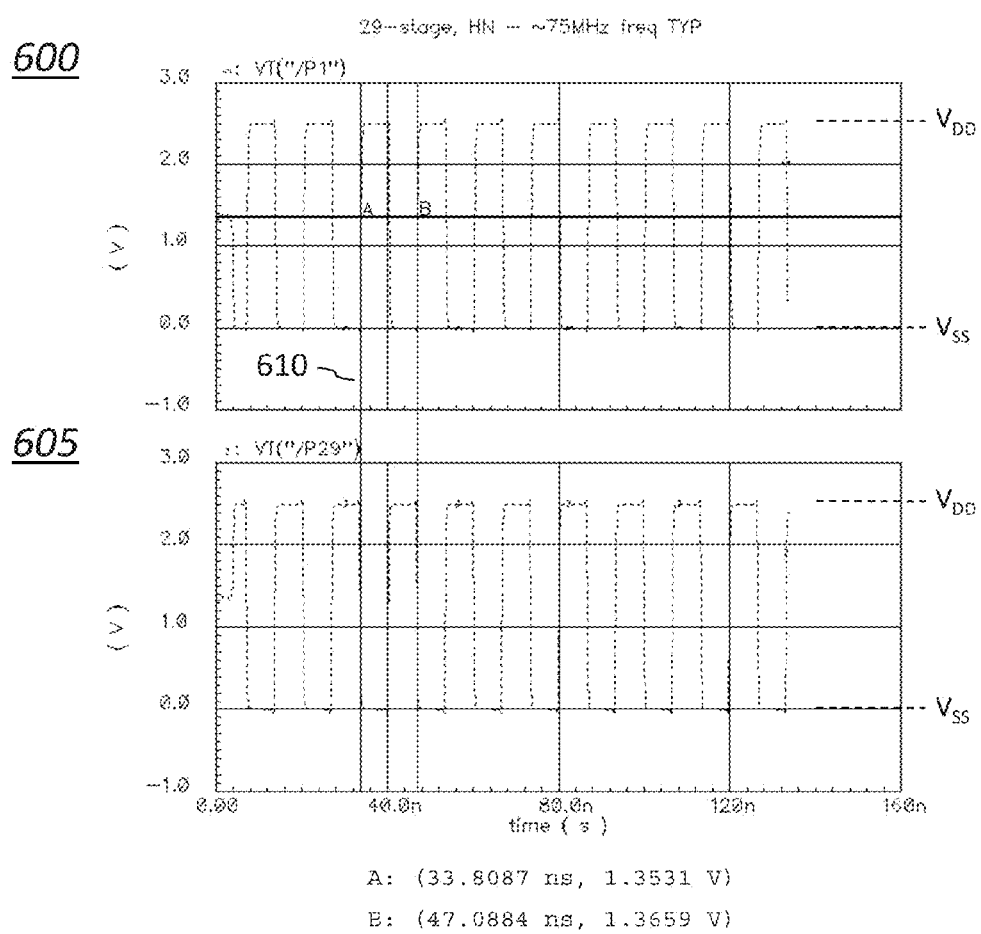
FIG. 6 shows input voltages of a first full-wave pump element and a last full-wave pump element of the ring pump shown in FIGS. 4A-4C.

FIG. 6 shows input voltage for the inverter stage of the first FWPump (400 in FIG. 4A) and the last FWPump (420 in FIG. 4C) of the ring pump shown in FIGS. 4A-4C. Specifically, a top voltage waveform (600) and a bottom voltage waveform (605) show the input voltages for the inverter stage of the first FWPump (400 in FIG. 4A) and the last FWPump (420 in FIG. 4C), respectively. As discussed earlier with reference to any one of FIGS. 1, 2, 3A, and 3B, the input voltage for the inverter stage of each FWPump is denoted by $V_{IN}$ (125 in FIG. 1) and applied to the IN terminal (105 in FIG. 1) of each FWPump.

With reference back to FIG. 6, the input voltage for the inverter stage of each FWPump in the ring pump of FIGS. 4A-4C oscillates between a positive oscillator supply of $V_{DD}$=+2.5 V and a negative oscillator supply $V_{SS}$=0 V. In other words, the inverter stage of each FWpump is either in a high voltage state of +2.5 V or in a low voltage state of 0 V. As typical of a ring oscillator, at any given time instant, the first FWPump (400 in FIG. 4A) and the last FWPump (420 in FIG. 4C) are in opposite voltage states. For instance, at an arbitrary time instant A (610), the first FWpump (400 in FIG. 4A) is transitioning from around 0 V to around +2.5 V while the last FWPump (420 in FIG. 4C) is transitioning from around +2.5 V to around 0 V. Consequently, at a time instant a few nanoseconds after time instant A (610), the first FWPump (400 in FIG. 4A) is at the high voltage state +2.5 V while the last FWPump (420 in FIG. 4C) is at the low voltage state 0 V. For the waveforms (600, 605) shown in FIG. 6, oscillation frequency of the ring pump is around 75 MHz.

As seen in both voltage waveforms (600, 605), the high voltage state, low voltage state, and oscillation frequency stay substantially constant over time. As previously discussed, the first and second capacitors (330, 335), as shown in FIGS. 3A and 3B, contribute to the voltage states and oscillation frequency staying substantially constant over time by preventing coupling between voltages present in the voltage boosting stage of each FWPump and voltages present in the inverter stage of each FWPump.

Figure 7A:
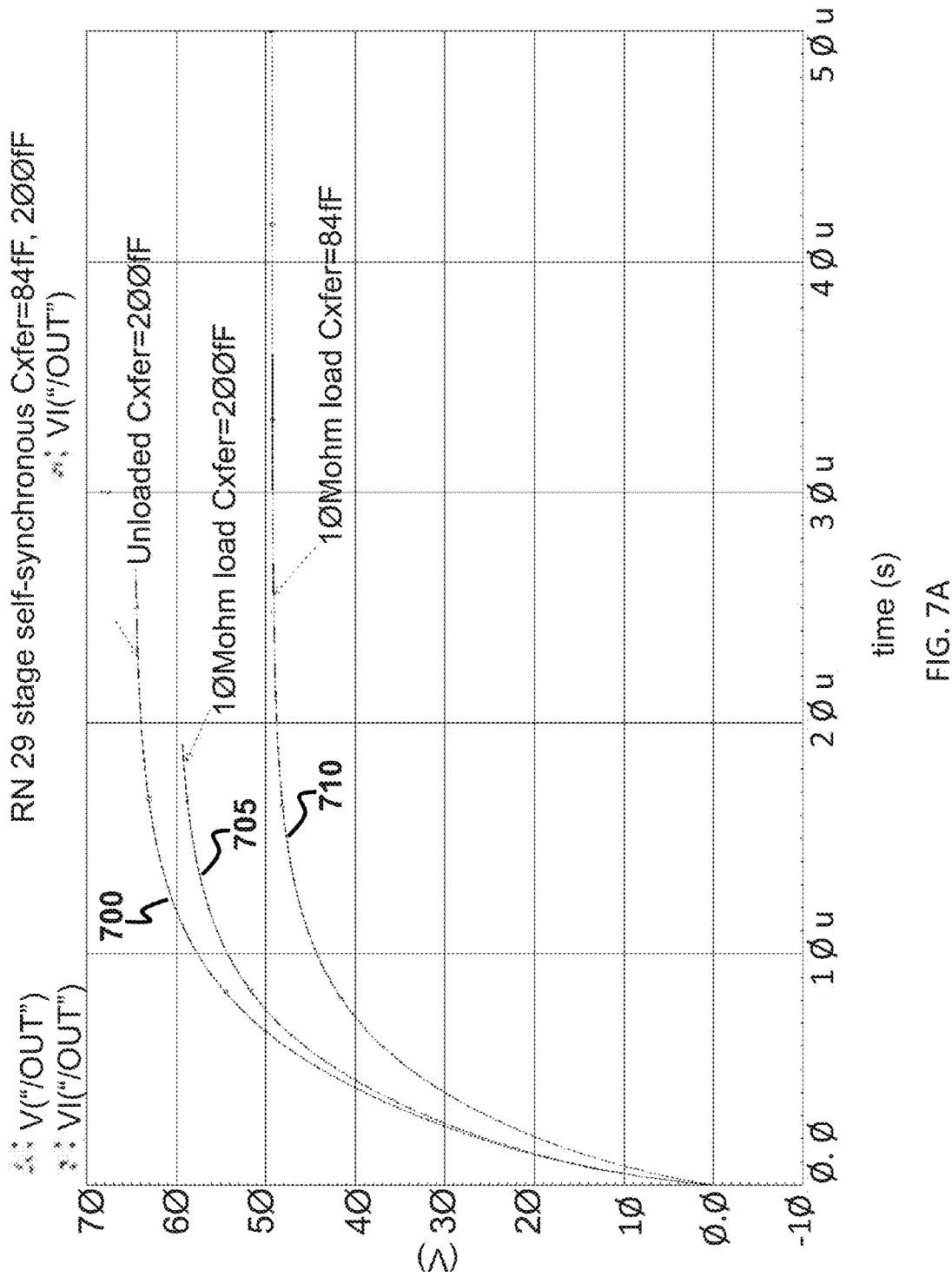
FIGS. 7A-7B show an output voltage of the ring pump in FIGS. 4A-4B as a function of time and a load circuit from which the output voltage is measured.
Figure 7B:
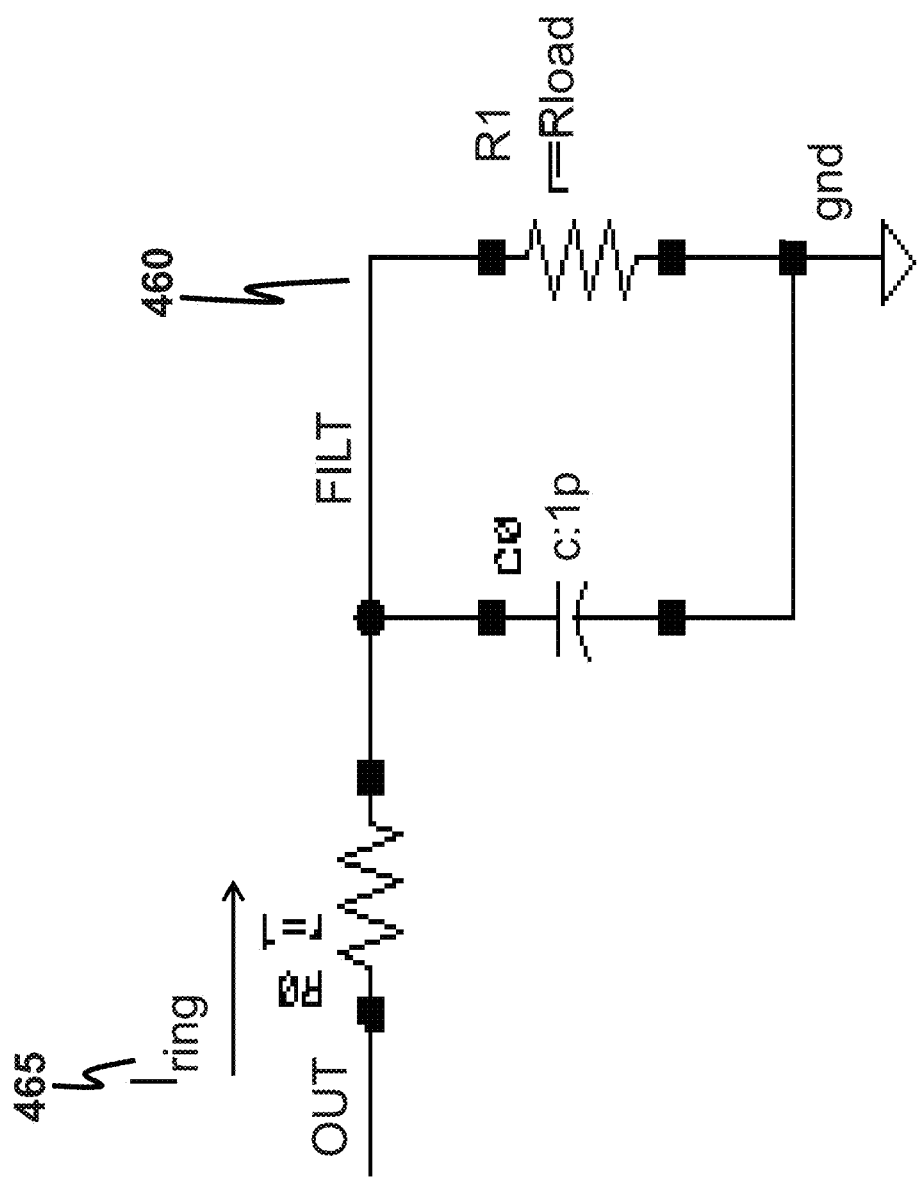

FIGS. 7A-7B shows the output voltage $V_{ring}$ (430 in FIG. 4C) of the ring pump of FIGS. 4A-4C as a function of time under different load circuits (460 in FIG. 4C) and different capacitance values for the first and second DC blocking capacitors (330, 335 in FIGS. 3A and 3B). The load circuit (460) shown in FIG. 4C and the input voltages shown in FIG. 6 are used to generate the output voltages. For the results shown in FIGS. 7A-7B, the initial voltage $V_0$ (450 in FIG. 4A) is set to +2.5 V.

A top curve (700 in FIG. 7A) shows that without the load circuit (460 in FIG. 4C) and with first and second capacitors (330, 335 in FIGS. 3A and 3B) of values $C_0=C_1$=200 fF in each FWPump, the ring pump embodiment shown in FIGS. 4A-4C has a ring output voltage $V_{ring}$ (430 in FIG. 4C) that saturates at about 65 V. A middle curve (705 in FIG. 7A) shows that with a 10 MΩ resistor as part of the load circuit (460 in FIG. 4C) and first and second capacitors (330, 335 in FIGS. 3A and 3B) of values $C_0=C_1$=200 fF in each FWPump, the voltage $V_{ring}$ (430 in FIG. 4C) saturates at around 60 V. Finally, a bottom curve (710 in FIG. 7A) shows that with decreased capacitances for the first and second capacitors (330, 335) of $C_0=C_1=84$ fF in each FWPump, the voltage $V_{ring}$ (430 in FIG. 4C) saturates at below 50 V.

From the middle and bottom curves (705, 710 in FIG. 7A), it is observed that higher capacitance values for the first and second capacitors (330, 335 in FIGS. 3A and 3B) yield higher values for the output voltage $V_{ring}$ (430 in FIG. 4C). As discussed earlier, DC blocking due to the first and second capacitors (330, 335 in FIGS. 3A and 3B) prevents coupling (improves isolation) between the inverter stage and the voltage boosting stage of each FWPump. Better prevention of coupling occurs with higher capacitance values for the first and second capacitors (330, 335 in FIGS. 3A and 3B). Such prevention of coupling aids in keeping oscillation frequency and voltage states ($V_{DD}$ and $V_{SS}$) of the inverters nearly constant over time, which yields higher values for the output voltage $V_{ring}$ (430 in FIG. 4C) of the ring pump.

Figure 8A:
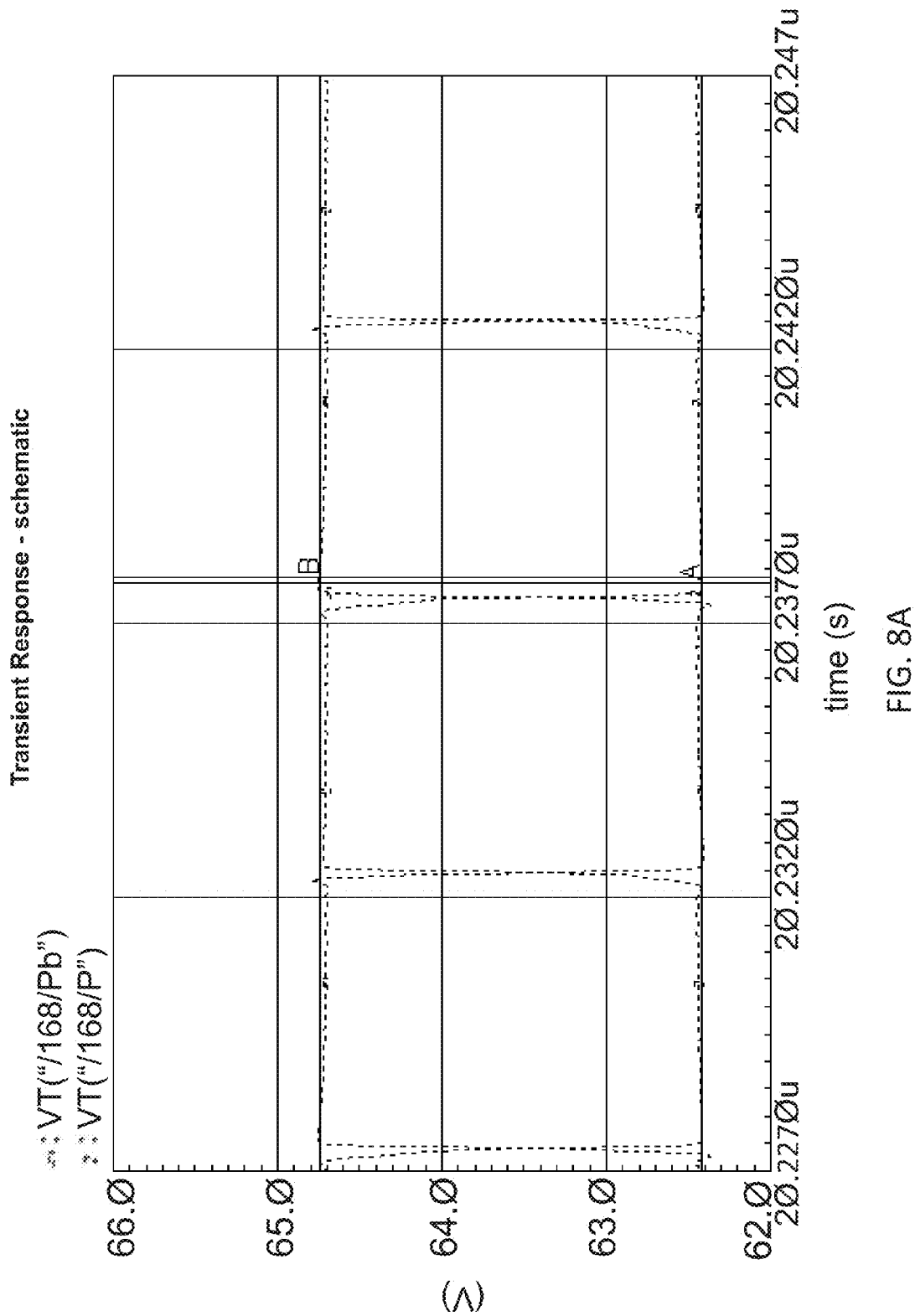
FIG. 8A shows an output voltage of DC blocking capacitors as a function of time without taking into account parasitic elements.
Figure 8B:
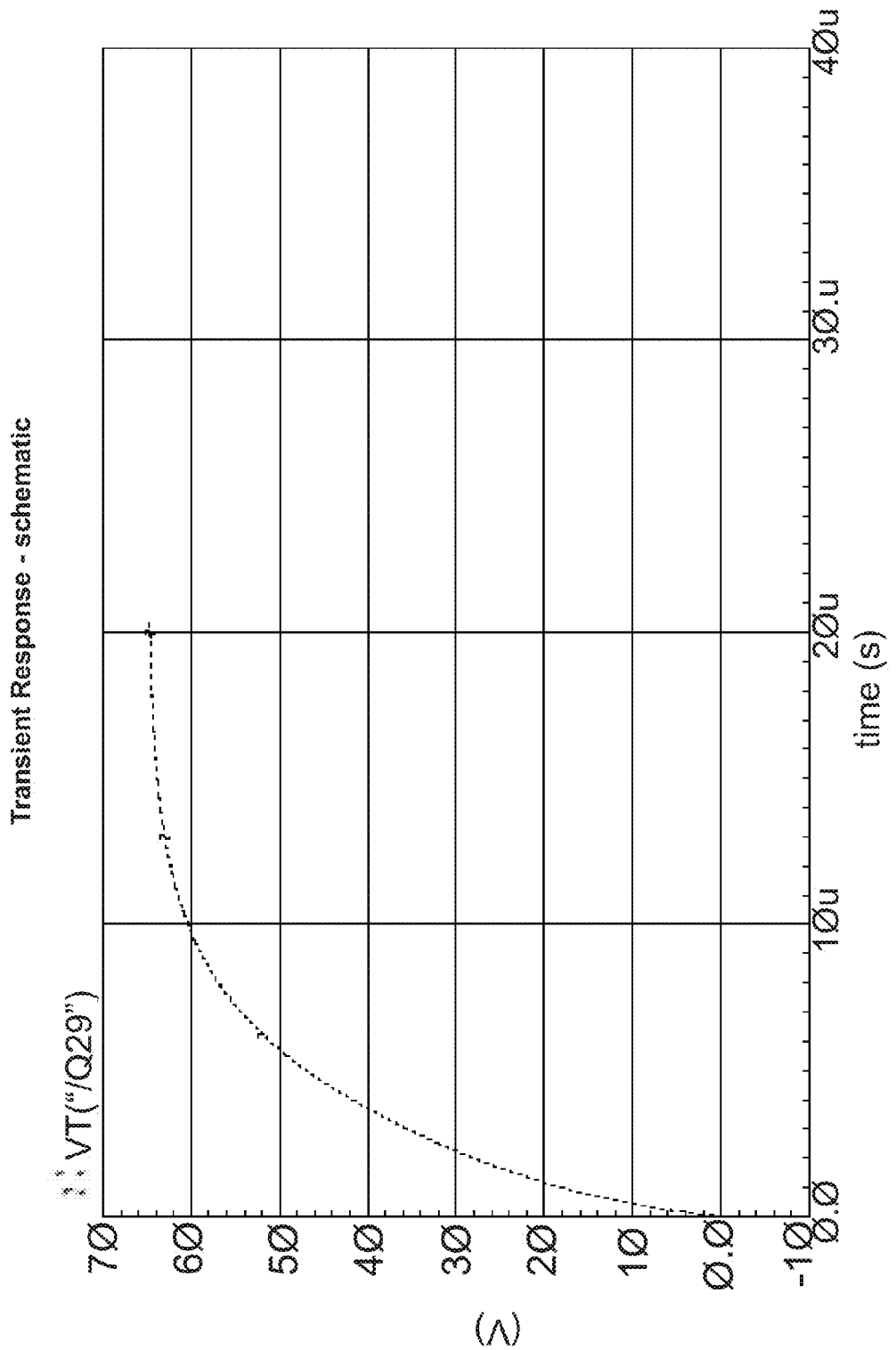
FIG. 8B shows an output voltage of a multiple-stage ring pump as a function of time without taking into account parasitic elements.
Figure 8C:
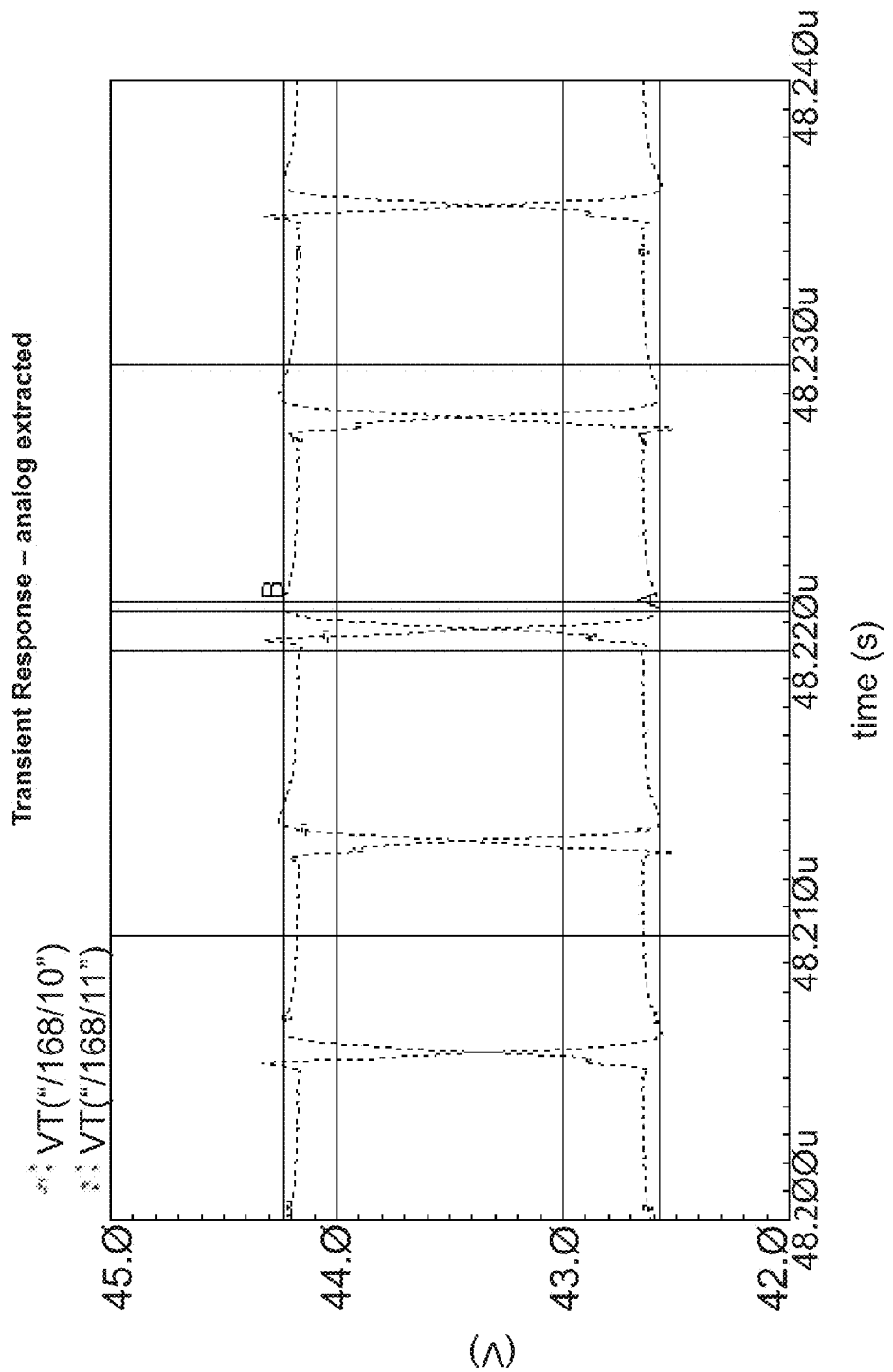
FIG. 8C shows the output voltage of the DC blocking capacitors as a function of time while taking into account parasitic elements.
Figure 8D:
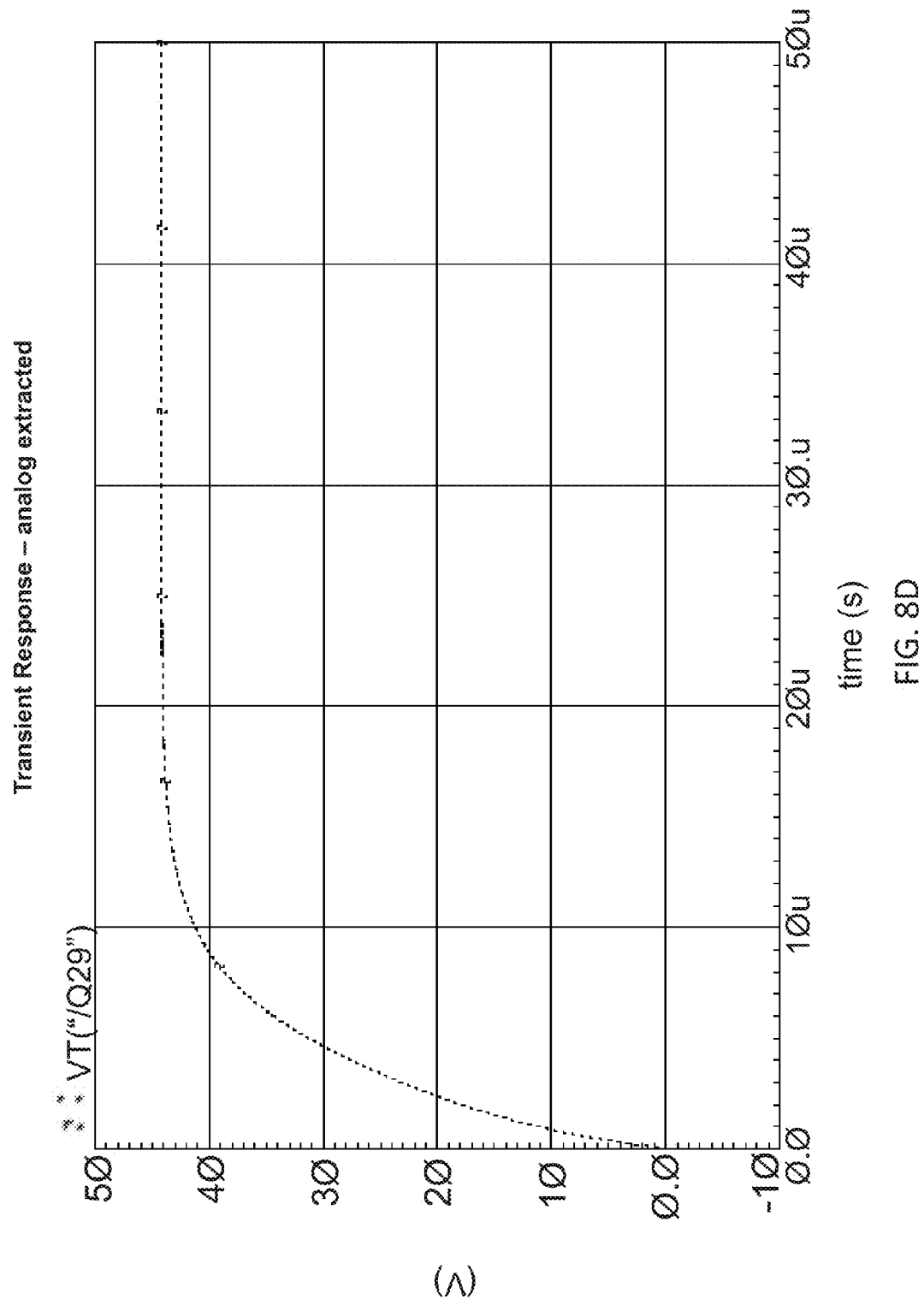
FIG. 8D shows the output voltage of the multiple-stage ring pump as a function of time while taking into account parasitic elements.

FIG. 8A shows voltage at the P node (340) and voltage at the Pb node (345), both nodes (340, 345) referred to in FIG. 3B, as a function of time for the embodiment depicted in FIGS. 4A-4C. Specifically, FIG. 8A shows the voltages of the P node (340) and the Pb node (345) of the last FWPump (420) shown in FIG. 4C. FIG. 8B shows the output voltage of the ring pump as a function of time. The ring pump output voltage $V_{ring}$ (430 in FIG. 4C) saturates at about 65 V.

An FWPump element shown in the layout in FIG. 5 is used to implement the ring pump in FIGS. 4A-4C. Voltages at the P node (340 in FIG. 3B) and Pb node (345 in FIG. 3B) are shown in FIGS. 8C and 8D. Parasitic elements such as parasitic gate-to-drain capacitance $C_{gd}$ and parasitic gate-to-source capacitance $C_{gs}$ of the active devices are taken into effect in the voltages. FIG. 8C shows the voltage at the P node (340 in FIG. 3B) and Pb node (345 in FIG. 3B) of the last FWPump (420) shown in FIG. 4C that includes the parasitic effects. FIG. 8D shows the ring pump output voltage $V_{ring}$ (430 in FIG. 4C) of the ring pump of FIGS. 4A-4C as a function of time. By including the parasitic effects, the ring pump output voltage $V_{ring}$ (430 in FIG. 4C) saturates at a lower voltage of about 44 V.

As shown in FIGS. 8A and 8C, voltage level of the nodes P and Pb (340, 345 in FIG. 3B) is at a pedestal voltage given by the reservoir capacitor (370 in FIGS. 3A and 3B) of the last FWPump (420 in FIG. 4C). In general, the first and second capacitors (330, 335 in FIGS. 3A and 3B), which function as DC capacitors, prevent coupling of the pedestal voltage with the inverters (305, 315, 320, 325 in FIGS. 3A and 3B) of any arbitrary FWPump. Consequently, as previously discussed, the first and second capacitors (330, 335 in FIGS. 3A and 3B) allow for the inverter stage of the FWPump to operate separately from the voltage boosting stage of the FWPump.

Figure 9:
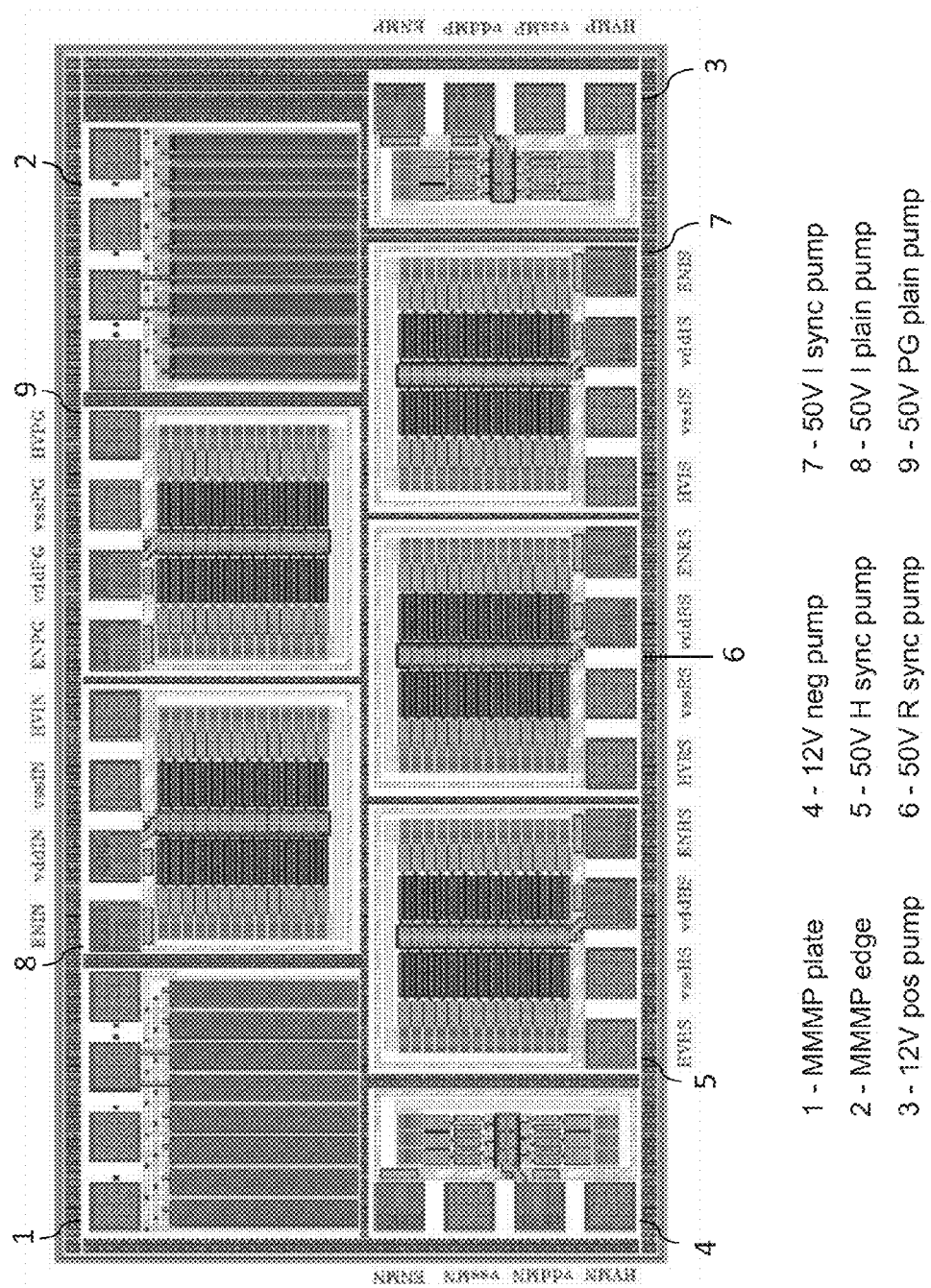
FIG. 9 shows a chip layout that includes different embodiments of ring pumps.

FIG. 9 shows a test chip that comprises an assortment of different embodiments of ring pumps. The different embodiments of the ring pump vary in number of stages in the ring pump and components used to implement the full-wave rectifier circuit. A 12 V positive pump (3) and a 12 V negative pump (4) comprised a fewer number of stages than the twenty-nine stages shown in FIGS. 4A-4C. A 50 V HS pump (5), 50 V RS pump (6), and 50 V IS pump (7) are each twenty-nine stage ring pumps, where each pump (5, 6, 7) utilizes different types of MOS transistors to implement the full-wave bridge rectifier. Specifically, the HS pump (5) comprised HP and HN MOS transistors, RS pump (6) comprised RP and RN MOS transistors, and IS pump (7) comprised IP and IN MOS transistors. Note that 'S' in each of "HS", "RS", and "IS" refers to "synchronous" since each of the full-wave bridge rectifiers in these embodiments (5, 6, 7) are synchronous rectifiers. A 50 V I plain pump (8) used diode-connected IN-type MOS transistors and a 50 V PG plain pump (9) used diodes instead of MOS transistors to implement the full-wave bridge rectifier.

It should be noted that metal-metal-metal-poly (MMMP) plate (1) and MMMP edge (2) are test structures for high voltage plate capacitors included as part of the test chip along with the different embodiments of the ring pump.

Figure 10:
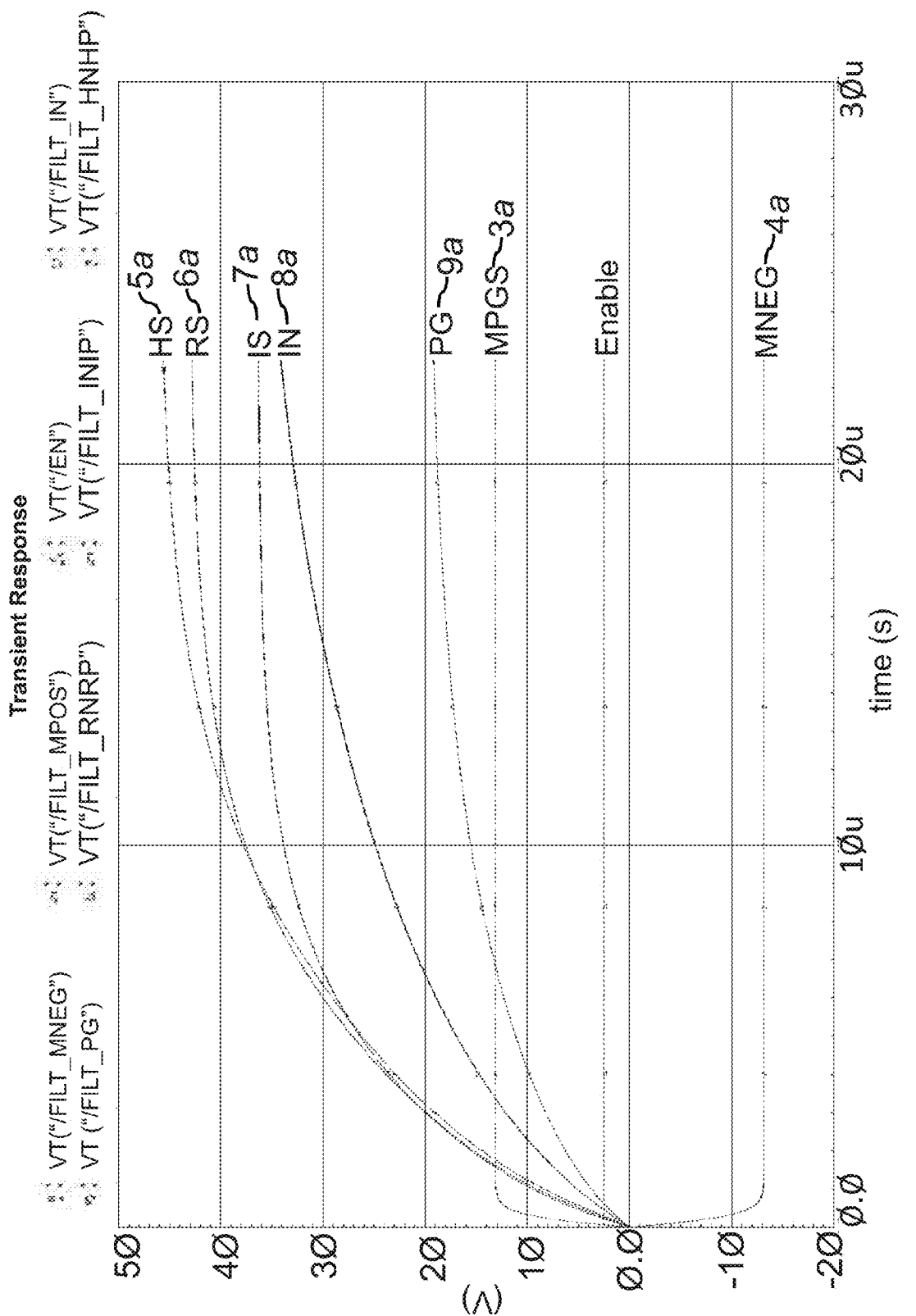
FIG. 10 shows output voltages of the various ring pumps in FIG. 9 as a function of time.

FIG. 10 shows output voltages of the various ring pumps in FIG. 9 as a function of time. Reference numerals used in FIG. 10 correspond with those used in FIG. 9. For instance, the 12 V positive pump (3) in FIG. 9 has an output voltage given by an MPOS curve (3a). The other ring pumps (4, 5, 6, 7, 8, 9) also have corresponding output voltages (4a, 5a, 6a, 7a, 8a, 9a). An enable signal is utilized for testing purposes, where the enable signal can be used to select only one of the various ring pumps (4, 5, 6, 7, 8, 9) at a time for testing.

Figure 11:
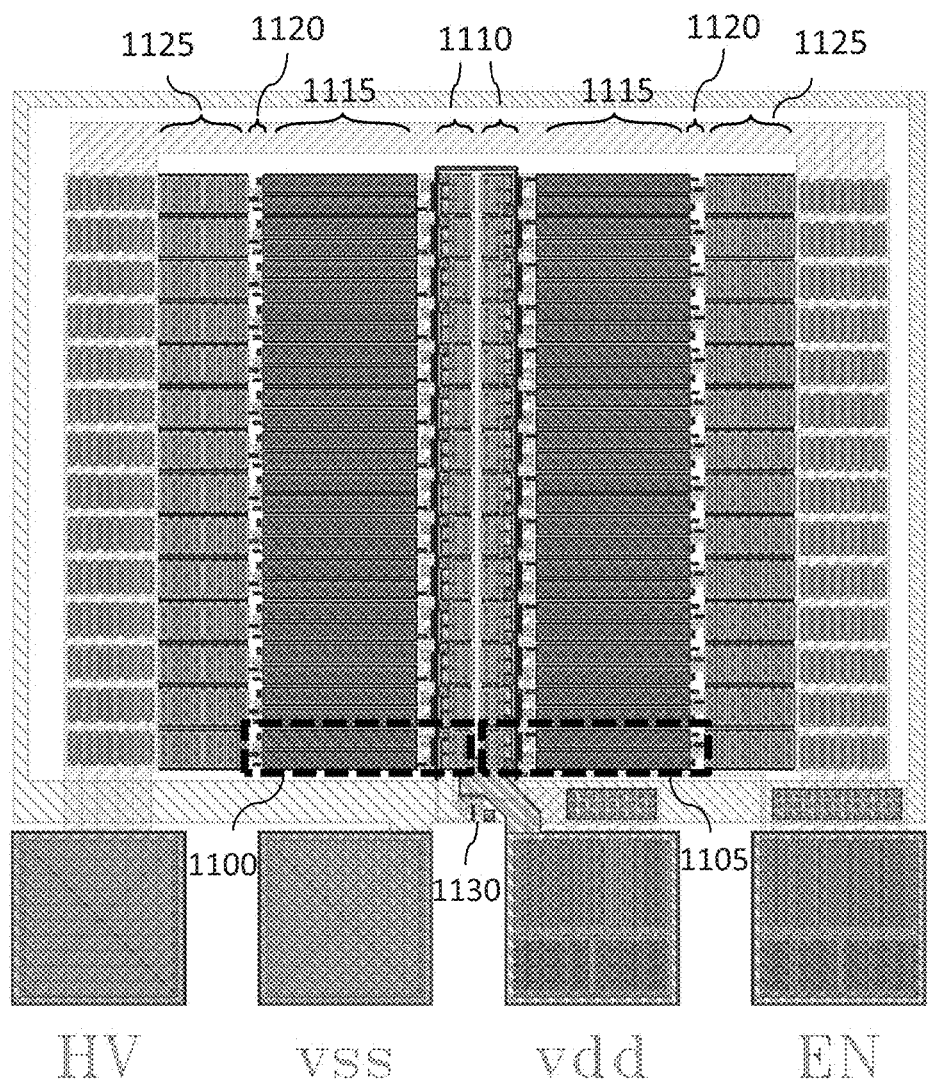
FIG. 11 shows an exemplary chip layout of a ring pump.

FIG. 11 shows a test chip that implements a ring pump similar to the ring pump in FIGS. 4A-4C. Specifically, the test chip shows a twenty-nine stage ring pump including twenty-eight FWPumps and one inverter (1130). The ring pump in FIG. 11 shows individual FWPump elements. In particular, a first FWPump element (1100), a last FWPump element (1105), and the inverter (1130) are identified. Operation of a cycle of an inverter ring in the ring pump begins at the inverter (1130) and circles back to the inverter (1130) via the last FWPump element (1105) on a right side of the test chip.

With reference to FIGS. 3A and 3B, the individual FWPump element (1100 in FIG. 11) comprises multiple inverters (305, 315, 320, 325), a first and second DC blocking capacitors (330, 335), a full-wave bridge rectifier (385), and a reservoir capacitor (370). The test chip in FIG. 11 shows the ring pump as well as the FWPump elements that form the ring pump. Specifically, a first and second column (1110) contain inverters (305, 315, 320, 325 in FIGS. 3A and 3B), a third and fourth column (1115) contain the first and second DC blocking capacitors (330, 335 in FIGS. 3A and 3B), a fifth and sixth column (1120) contain the full-wave bridge rectifiers (385 in FIGS. 3A and 3B), and a seventh and eighth column (1125) contain the reservoir capacitors (370 in FIGS. 3A and 3B) of each FWpump element.

Figure 12A:
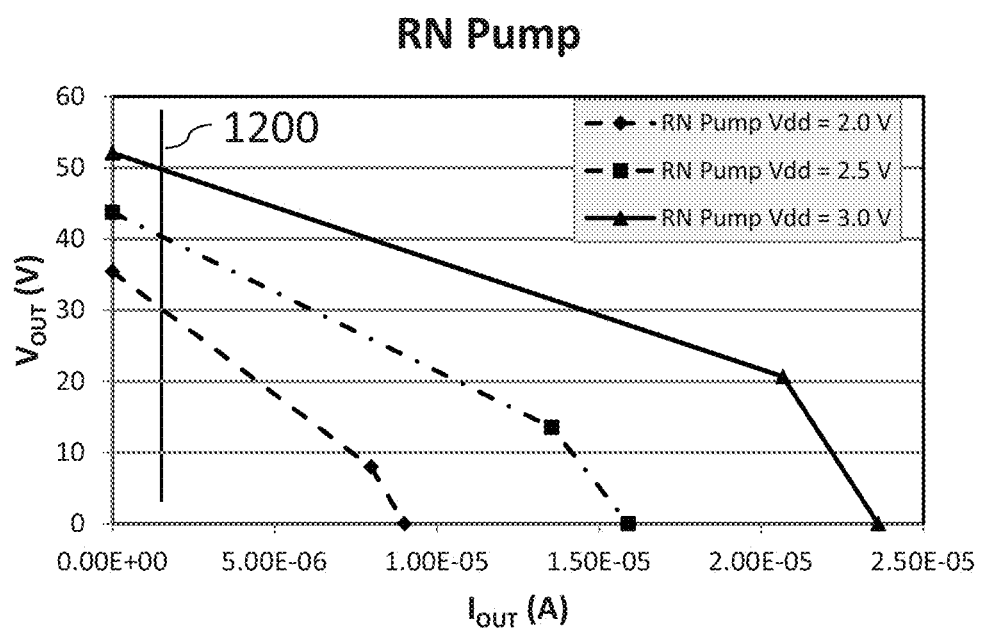
FIGS. 12A-12C show graphs of output voltages of different embodiments of the ring pump as a function of output current of the ring pump.
Figure 12B:
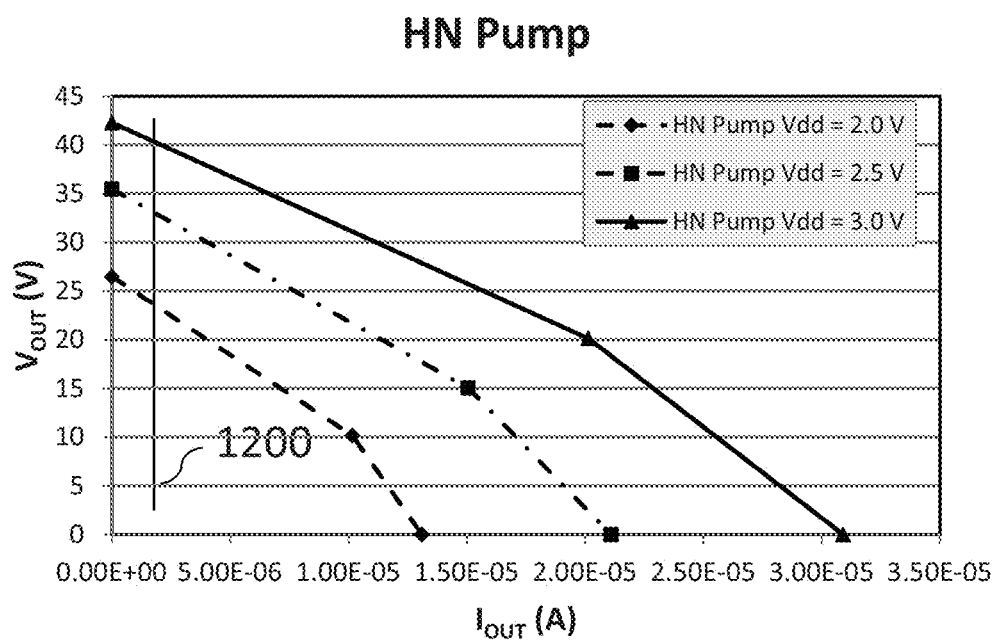
Figure 12C:
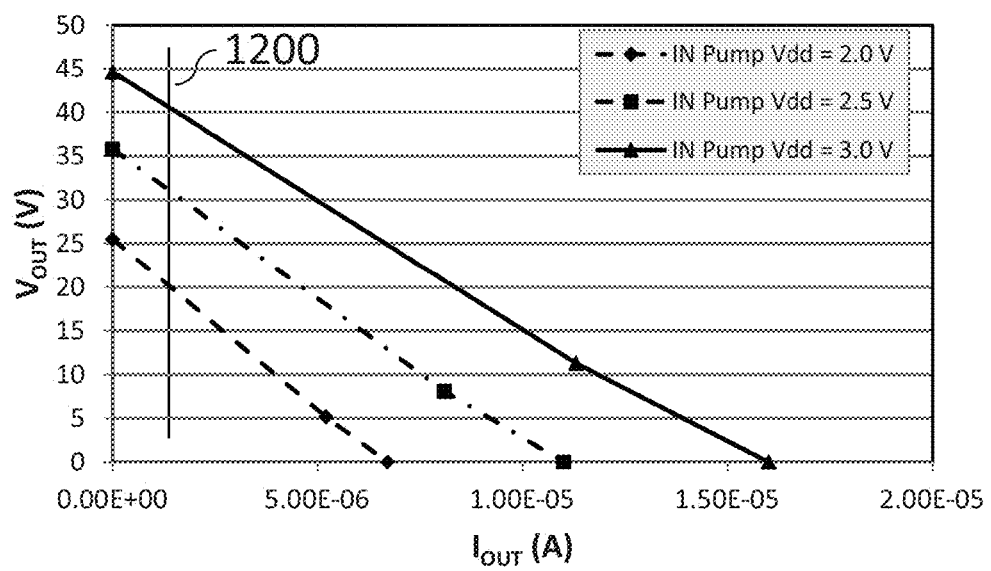

FIGS. 12A-12C show graphs of output voltages of different embodiments of the ring pumps as a function of the output current. Specifically, FIGS. 12A, 12B, and 12C show graphs pertaining to data obtained from a 50 V ring pump that comprises a full-wave bridge rectifier implemented using RN MOS transistors, HN MOS transistors, and IN MOS transistors, respectively, under different values for a positive oscillator supply $V_{DD}$ and where $V_{SS}=0$ V.

Each graph has a vertical line (1200) corresponding to a selected operating current for the 50 V ring pump. Type of MOS transistor and value for the positive oscillator supply $V_{DD}$ can be selected based on required output voltage and/or required output current for a desired application.

The examples set forth above are provided to give those of ordinary skill in the art a complete disclosure and description of how to make and use the embodiments of the high voltage ring pump of the disclosure, and are not intended to limit the scope of what the inventor regards as his disclosure. Modifications of the above-described modes for carrying out the disclosure may be used by persons of skill in the art, and are intended to be within the scope of the following claims.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a", "an", and "the"

include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

What is claimed is:

1. A circuit including at least two coupled charge pump elements, each charge pump element including:
   an inverter having an input terminal for receiving an input voltage from a ring-connected preceding charge pump element and an inverter output terminal externally accessible from the charge pump element and ring-connected to a succeeding charge pump element, wherein the input voltage applied to the input terminal of the inverter is inverted to obtain a complementary output voltage on the inverter output terminal;
   at least one pump block configured to be coupled to the preceding charge pump element and to the succeeding charge pump element, each pump block having (1) a voltage input terminal, externally accessible from that pump block and configured to be serially coupled to the preceding charge pump element, for taking in a pump block input voltage, and (2) a voltage output terminal, externally accessible from that pump block and configured to be serially coupled to the succeeding charge pump element, for sending out a pump block output voltage, and (3) first and second internal voltage inputs, wherein the pump block output voltage of each pump block is larger in magnitude than the pump block input voltage to that pump block; and
   a driving circuit connected to the inverter output terminal on one end and to the first and second internal voltage inputs of at least one pump block on another end, wherein the driving circuit generates a first voltage and a second voltage based on the output voltage at the inverter output terminal of the inverter, and wherein each of the first and second voltages are respectively applied to the first and second internal voltage inputs of the at least one pump block.

2. The charge pump element according to claim 1, wherein each pump block comprises:
   a full-wave bridge rectifier; and
   a charge storage device connected with the full-wave bridge rectifier.

3. The charge pump element according to claim 2, wherein the driving circuit comprises a first capacitor connected to the first internal voltage input of the at least one pump block and a second capacitor connected to the second internal voltage input of the at least one pump block.

4. The charge pump element according to claim 3, wherein the driving circuit further comprises:
   an odd number of additional inverters, serially connected to each other, wherein the odd number of additional inverters is connected to the inverter output terminal on one end and to the first capacitor on another end; and
   an even number of additional inverters, serially connected to each other, wherein the even number of additional inverters is connected to the inverter output terminal on one end and to the second capacitor on another end.

5. A method for boosting voltage using a plurality of coupled charge pump elements, comprising:

applying a first oscillating signal from a preceding charge pump element to an input terminal of an inverter of one charge pump element to obtain a complementary second oscillating signal on an inverter output terminal, the inverter output terminal being externally accessible from the one charge pump element and coupled to a succeeding charge pump element;
   coupling the complementary second oscillating signal to a driving circuit;
   generating a first internal voltage and a second internal voltage in the driving circuit based on the second oscillating signal;
   coupling the first and second internal voltages of the driving circuit to respective first and second internal voltage inputs of at least one pump block;
   taking in a pump block input voltage through a voltage input terminal externally accessible from the at least one pump block and serially coupled to the preceding charge pump element; and
   outputting a pump block output voltage from the at least one pump block, through a voltage output terminal externally accessible from the at least one pump block and coupled to the succeeding charge pump element, in response to the first and second internal voltages,
   wherein the pump block output voltage of each pump block is larger in magnitude than the pump block input voltage to that pump block.

6. The method according to claim 5, wherein each of the first and second oscillating signals is either at a first voltage state or a second voltage state.

7. The method according to claim 5, wherein the pump block output voltage of each pump block is based on a difference between the first oscillating signal and the second oscillating signal coupled to that pump block.

8. A circuital arrangement adapted to provide voltage to a load circuit, comprising a plurality of charge pump elements, each charge pump element comprising:
   (a) an inverter configured to be coupled to another charge pump element, wherein an input voltage to the inverter is inverted to obtain a complementary output voltage for the charge pump element;
   (b) at least one pump block configured to be coupled to another charge pump element, wherein an output voltage of a particular pump block in the at least one pump block is larger in magnitude than an input voltage to the particular pump block in the at least one pump block; and
   (c) a driving circuit connected with the inverter on one end and the at least one pump block on another end, wherein the driving circuit generates a first voltage and a second voltage based on the input voltage to the inverter, and wherein each of the first and second voltages are adapted to be applied to the at least one pump block;
   wherein a plurality of charge pump element inverters are ring connected together and a plurality of charge pump element pump blocks are serially connected together.

9. The circuital arrangement according to claim 8 wherein the input voltage to the inverter of a first charge pump element of the plurality of charge pump elements is provided by the complementary output voltage of a last charge pump of the plurality of charge pump elements.

10. The circuital arrangement according to claim 9 wherein the input voltage to the inverter of a charge pump element other than the first charge pump element of the plurality of charge pump elements is provided by the complementary output voltage of a previous charge pump element of the plurality of charge pump elements.

11. The circuital arrangement according to claim 10 wherein the input voltage to the pump block of a charge pump element other than a first charge pump element of the plurality of charge pump elements is provided by the output voltage of the pump block of a previous charge pump element of the plurality of charge pump elements.

* * * * *